(12) United States Patent
Parker et al.

(10) Patent No.: US 11,100,560 B2
(45) Date of Patent: Aug. 24, 2021

(54) EXTENDING MACHINE LEARNING TRAINING DATA TO GENERATE AN ARTIFICIAL INTELLIGENCE RECOMMENDATION ENGINE

(71) Applicant: Stitch Fix, Inc., San Francisco, CA (US)

(72) Inventors: Hilary S. Parker, San Francisco, CA (US); Allison M. Barros, San Mateo, CA (US)

(73) Assignee: Stitch Fix, Inc., San Francisco, CA (US)

( * ) Notice: Subject to any disclaimer, the term of this patent is extended or adjusted under 35 U.S.C. 154(b) by 153 days.

(21) Appl. No.: 16/358,362

(22) Filed: Mar. 19, 2019

(65) Prior Publication Data
US 2020/0302506 A1    Sep. 24, 2020

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01); *G06Q 30/0603* (2013.01)

(58) Field of Classification Search
CPC . G06Q 30/0603; G06Q 30/0631; G06N 20/00
See application file for complete search history.

(56) References Cited

U.S. PATENT DOCUMENTS

| | | | | |
|---|---|---|---|---|
| 5,930,769 | A | * | 7/1999 | Rose ...................... G06Q 30/06 345/419 |
| 8,429,019 | B1 | | 4/2013 | Yeatts |
| 2002/0045959 | A1 | * | 4/2002 | Van Overveld ........ G06Q 30/02 700/90 |
| 2005/0102203 | A1 | | 5/2005 | Keong |
| 2007/0179916 | A1 | * | 8/2007 | Wan .................... G06Q 30/0623 705/500 |
| 2010/0191770 | A1 | * | 7/2010 | Cho ....................... G06Q 30/02 707/783 |
| 2013/0031034 | A1 | | 1/2013 | Gubin |
| 2015/0154691 | A1 | | 6/2015 | Curry |
| 2016/0292769 | A1 | * | 10/2016 | Colson ................. G06Q 10/087 |
| 2017/0011452 | A1 | * | 1/2017 | Beckham ............. G06Q 20/204 |
| 2017/0076011 | A1 | | 3/2017 | Gannon |
| 2017/0287044 | A1 | | 10/2017 | Rose |
| 2018/0182016 | A1 | | 6/2018 | Giampaolo |
| 2018/0211206 | A1 | | 7/2018 | Baxter |

OTHER PUBLICATIONS

Eun, Y. K., & Youn-Kyung, K. (2004). Predicting online purchase intentions for clothing products. European Journal of Marketing, 38 (7), 883-897. doi:http://dx.doi.org/10.1108/03090560410539302.*

* cited by examiner

*Primary Examiner* — Resha Desai
(74) *Attorney, Agent, or Firm* — Van Pelt, Yi & James LLP

(57) ABSTRACT

A catalog of physical items associated with a target user is accessed. At least a portion of the catalog is at least in part automatically generated based on a retention of one or more of the physical items provided to the target user. A machine learning model trained using outfit combination information gathered from other users is used to automatically determine for the target user, at least a portion of one or more recommended outfit combinations of a plurality of physical items among the physical items within the catalog. An indication of a selected one of the one or more recommended outfit combinations is provided to the target user.

19 Claims, 11 Drawing Sheets

EXTENDING MACHINE LEARNING TRAINING DATA TO GENERATE AN ARTIFICIAL INTELLIGENCE RECOMMENDATION ENGINE

BACKGROUND OF THE INVENTION

Recommendation systems typically require extensive individual preference data such as a long history of tracked purchase data in order to make accurate predictions on future customer activity. In many scenarios, a large set of prediction data is needed since each individual's interests and tastes can be different and are difficult to succinctly define. Moreover, customers may be hesitant to supply large amounts of personal data due to privacy and security concerns. Even when available, the collection and entry of sufficient sample prediction data is a challenging technical problem. Conversely, in the event a user's prediction data is limited to only a few samples of accurate data, a parallel technical problem exists that there is insufficient prediction data to make accurate predictions. For example, due to insufficient personal data, recommendations based on insufficient prediction data are frequently wrong and have little correlation to a customer's interests and tastes. Therefore, there is a need for a scalable technical solution to increase the sample space of accurate prediction data for an individual customer such that the customer's actions, tastes, and/or interests can be accurately predicted when only a sparse set of accurate customer information is available.

BRIEF DESCRIPTION OF THE DRAWINGS

Various embodiments of the invention are disclosed in the following detailed description and the accompanying drawings.

DETAILED DESCRIPTION

Figure 1:
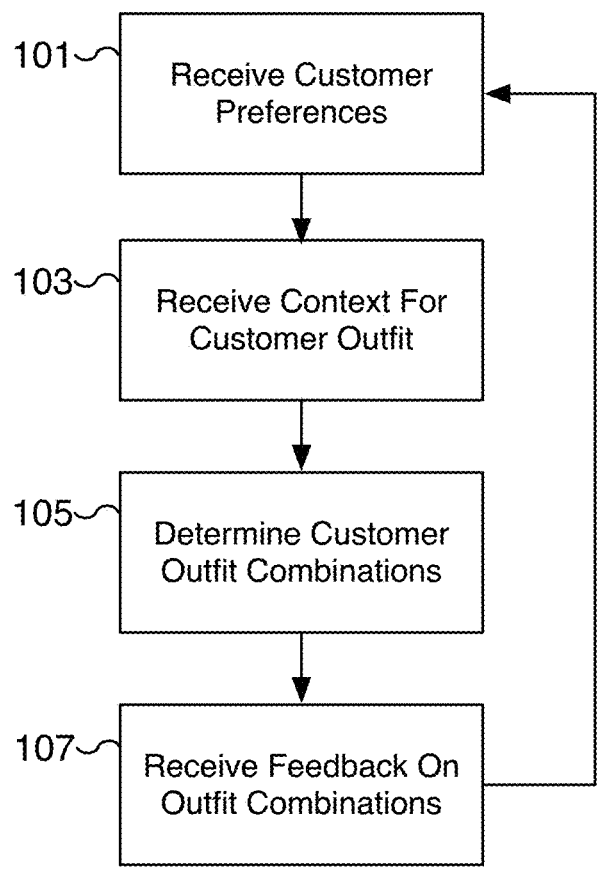
FIG. 1 is a flow chart illustrating an embodiment of a process for providing an outfit combination recommendation using artificial intelligence (AI).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A scalable technical solution for improving customer predictions using only sparse individual customer prediction data is disclosed. Using the disclosed techniques, the prediction and customer data of multiple customers is aggregated to enlarge the sample space of training data for training a machine learning model to predict customer activity including customer preferences, interests, and tastes. Once the space of training data is enlarged, the training data can be automatically aggregated into target categories for training the machine learning model. By training on an aggregated target category, the trained machine learning model is applicable for predicting not only individual customer activity but the solution also scales to include any other customers that are clustered within the aggregated target category. Although customers are clustered to improve the scalability and performance of prediction results, in various embodiments, the predictions can be highly individual and customized for individual customers by sourcing results for each customer from a data source or catalog of individual items associated with the customer.

In some embodiments, users are clustered into target categories based on user profile data. For example, users with similar geography, income, employment, age, gender, and/or other attributes are clustered into a segmented target category. A segmented target category allows training data such as user preferences to be aggregated from all of the customers in the target category. Gaps in the sparse prediction data are filled in by data from related customers. In some scenarios, the gaps are due to information withheld as a result of security and/or privacy concerns. Instead, sparse individual data is aggregated along segmented target categories until the amount of captured training data exceeds the threshold required to accurately train a machine learning model using artificial intelligence techniques. For example, to increase the amount of training data, the target category can be expanded by adding or modifying segmentation parameters. Using a trained machine learning model, an artificial intelligence recommendation engine can predict recommendations for a user. For example, an outfit combination recommendation can be predicted and provided as a recommendation to a user for selecting an outfit to wear. The recommended outfit combinations are based on the user's style and fit preferences and are also personalized based on items available to the user. For example, the user's available wardrobe may be used to determine the items that make up a recommended outfit. One or more items of the outfit combination may also be selected from an inventory of items available for the user to trial and/or purchase. In some embodiments, the recommended outfits are based on selecting one or more items and building a recommended outfit combination based on the selected items. For example, a top is selected and one or more outfit combinations incorporating the selected top are recommended. Utilizing the user's preferences, including outfit style preferences and optional selected items for generating an outfit combination, a trained machine learning model is used to determine one or more corresponding outfit combinations.

In some embodiments, a human stylist may be presented with the determined outfit combinations and provide input to further refine the recommended outfit combinations. Once an outfit combination is selected, one or more different methods are used to provide the selected outfit combination recommendations to the user. For example, outfit combination recommendations can be provided via text message, email, a mobile app, a messaging platform, a web interface, a smart home device, etc. The frequency and timing of the outfit combination recommendations can be configured as well. For example, outfit combinations can be provided daily such as in the morning before the outfit is to be worn, the night before an outfit is to be worn, or at a time configured by the customer. Outfits can be based on scheduled events such as weddings, business meetings, formal events, exercise and/or workout events or classes, business trips, vacations, etc. Outfits can also be based on the type of desired attire such as work attire, weekend attire, night attire, exercise attire, casual attire, etc. In various embodiments, the outfit combinations recommended are based at least in part on the expected weather, previously worn items, the expected dress of other attendees, recent fashion trends, and/or packing requirements such as luggage limitations, among other factors. For example, recently worn items may be excluded from inclusion in the recommended outfit combination until a time threshold has elapsed. In various embodiments, the time threshold can be learned or configured by the customer. For example, a two-week threshold prevents the same item from being worn more than once during the two-week period. In some embodiments, feedback on the recommended outfit combinations including the outfit selected from the recommendations and/or the outfit worn is provided. The feedback may be stored and used to improve the quality of future outfit combination recommendations.

In some embodiments, a catalog of physical items associated with a target user is accessed. For example, a user's wardrobe of available items that can be worn is stored in a data store and made accessible for determining an outfit combination that is personalized for the user. In some embodiments, at least a portion of the catalog is at least in part automatically generated based on a retention of one or more of the physical items provided to the target user. For example, the catalog may be based on physical items such as clothing items or accessories provided to the user for purchase. Any items that the user decided to retain by purchasing are then automatically included in the user's catalog of physical items. In some embodiments, the catalog is automatically updated by providing a list of items, for example, via email receipts, purchase confirmations, purchase history, photos of the user's wardrobe, etc. In some embodiments, a machine learning model trained using outfit combination information gathered across multiple users is used to automatically determining for the target user, at least a portion of one or more recommended outfit combinations of a plurality of physical items among the physical items within the catalog. For example, a machine learning model is trained based on outfit combinations matching certain preferences such as style and fit. The training data may be gathered by collecting user preferences and corresponding preferred outfit combinations for an audience of users, some of which may have similar preferences as the target user. Once trained, the trained machine learning model is then used to automatically recommend outfit combinations based on the target user's preferences. The outfit combinations may utilize one or more physical items among the physical items within the user's catalog. In some embodiments, the target user is provided with an indication of a selected one of the one or more recommended outfit combinations. For example, the user is provided with at least one of the recommended outfit combinations via a composited image of the outfit or another appropriate indication. The recommended outfit combinations may be filtered or refined by a human stylist. For example, a stylist familiar with the user's style may narrow the recommended outfit combinations. An indication of the selected recommended outfit combinations may be provided via text message, email, a mobile app, a web application, a social media feed, or another appropriate medium.

In some embodiments, the user provides feedback on the recommended outfit combinations to further refine the user's preferences and future recommendations. For example, the user can swipe using different gestures to accept or reject different outfit combinations via a mobile application. As another example, the user can modify the recommended outfit combination by interacting with the outfit combination to change items of the outfit using a mobile app on a smartphone device. In some embodiments, the user may submit a photo of the user's outfit to provide feedback on the recommended outfit combination. For example, the submitted photo may illustrate that the user modified and/or added accessories but chose to wear most (or all) of the recommended outfit combination.

FIG. 1 is a flow chart illustrating an embodiment of a process for providing an outfit combination recommendation using artificial intelligence (AI). The outfit recommendation is provided based on the preferences of an individual and personalized to that individual. The individual's preferences may be based on properties such style, fit, and item availability. For example, the outfit recommended is generated based at least in part on items available to the user such as items in the user's wardrobe or recent purchase history that together combines to match the user's style aesthetics. Using the process of FIG. 1, one or more custom outfit recommendations are suggested to a user. This process greatly simplifies the daily outfit styling challenges some users face. For example, every morning, the night before, prior to a business trip or vacation, or at another appropriate time, one or more outfit combinations are recommended as suggestions to the user. The user can utilize the outfit combinations to determine the outfits to wear over the recommendation period. For example, a daily recommendation may include one or more recommendations for the day's activities while a business trip recommendation may include multiple outfit recommendations sufficient to covering the entire length of the trip. The process of FIG. 1 may be performed in part by using a mobile device and/or remote processing server. In some embodiments, the process of FIG. 1 is performed at least in part by using recommendations engine 211 of FIG. 2 to determine the recommended outfits. In some embodiments, the process of FIG. 1 is performed at least in part by using processor 601 of computer system 600 of FIG. 6 to provide indications of the outfit combination recommendations to a user.

At 101, customer preferences are received. For example, customer preference data is collected from the user. The preferences may include style preferences including individual item preferences as well as outfit preferences. For example, an individual item preference may indicate the user prefers to wear slim-fit jeans instead of regular-fit jeans. As another example, an individual item preference may indicate the user prefers long sleeve blouses to three-quarter length sleeve blouses or outerwear with buttons instead of zippers. Outfit preferences relate to the preferences the user has for outfit combinations, which include how to combine different individual items including tops, bottoms, shoes, jewelry, outerwear, handbags, etc. In some embodiments, the customer preferences include sizing preferences such as the sizes that best fit the user. The different preferences including style and/or sizing preferences can be learned over time by collecting feedback from the user and other similar users.

In some embodiments, customer preferences are received via photos submitted by the user and/or tagged by the user and processed using image recognition to identify outfits and items. For example, the customer can submit photos of the user's favorite outfits or a webpage (such as a social media link) of a collection of favorite outfits. As another example, a user can provide particular styles (e.g., by category, time period, or another appropriate characterization) that the user identifies with. Similarly, a user may provide individuals (such as celebrities, movie characters including non-fictional characters, high-profile individuals, etc.) that exemplify a style the user prefers. The social media content including social media feeds of the customer and/or identified users can be used to analyze and determine the customer's preferred styles.

In some embodiments, customer preferences including outfit style preferences are at least in part received by submitting sample outfits representing the customer's style preferences. For example, a customer and/or stylist can use a design tool to generate sample outfits that define the customer's desired style. Using a design tool, a sample outfit may be constructed by selecting multiple items from options to create an outfit combination. For example, a top is selected from an inventory of tops, a bottom is selected from an inventory of bottoms, and a pair of shoes is selected from an inventory of footwear. One or more items can be selected from an inventory of items that may be separated into categories such as tops, bottoms, footwear, accessories, outer layers, etc. Additional categories may be available and the items may be sorted by different characteristics, such as garment type.

In some embodiments, the user provides feedback on styles using a mobile application. For example, a feed or sequence of outfits or items is shown to the customer and the customer can provide different gestures to provide positive or negative feedback. Both positive and negative feedback may be used to reinforce the customer's personal style preferences. In some embodiments, additional granularity of feedback is provided. A customer can indicate she or he likes the outfit but prefers a top in a different material or a different style of shoes, etc. As another example, the customer can indicate she or he likes the outfit but prefers the items in different colors that better match her or his skin tone.

At 103, context for a customer outfit is received. In various embodiments, the context for recommending customer outfits includes a variety of factors including the catalog of physical items associated with a target such as the user's wardrobe, the expected weather, the expected dress attire (work, casual, exercise, etc.), previously worn items, current trends, length of visit, expected activities to be performed, etc. The context is used to more accurately identify strong recommended outfits. For example, depending on the weather context (e.g., temperature, humidity, rain, sun, snow, etc.), different outfits are recommended and/or different items will be included in the recommended outfit.

In some embodiments, the customer's calendar of events is received and used to determine outfits for particular events. For example, a customer can share her or his calendar and/or specific events (e.g., wedding, beach vacation, night out, exercise class, fishing trip, etc.). The events are received and used to determine outfits appropriate for the event. Similarly, events can be provided via email, social media feeds, travel purchases such as airline, car, and hotel reservations, etc. In some embodiments, the events are associated with a length and/or number of outfits. For example, a business trip may be three days long and require a minimum of five work outfits and three exercise outfits. As another example, a beach vacation may be five days long and require five days of vacation outfits in addition to three beach outfits, two formal dinner outfits, and two travel outfits. In some embodiments, the context includes the customer's event as well as the customer's party. For example, a customer may require outfits for the customer in addition to the customer's family such as accompanying children. The outfits for the customer and family may be used to provide a packing list for the entire party.

In some embodiments, the context includes the items available to the user such as the user's current wardrobe. The catalog of items associated with the user may be received and/or updated over time by supplying photos of the user's items, purchase confirmations, purchase history, email receipts of purchases, or via another appropriate submission process. In some embodiments, image and/or text recognition is used to identify the available items from submitted information. In some embodiments, one or more items such as common or essential items are inferred. For example, depending on the user's profile, a catalog may be inferred to include a brown belt, a black belt, and a pair of dress pants. Inferred items may be confirmed via another process such as via a user interface dialog prompting the user to confirm the existence of the inferred items. In some embodiments, inferred items are used as essential items for a wardrobe for building outfit combinations. Missing items may be provided to the user and made available for purchase.

At 105, customer outfit combinations are determined. In some embodiments, the determined outfit combinations are provided as recommendations to the customer. In various embodiments, the determined outfit recommendations are determined using a trained machine learning model based on the customer's preferences and context received at 101 and 103. The customer's preferences and context may be used to determine a segmented target category for the customer and the appropriate machine learning model for the segmented target category is applied. In some embodiments, a human stylist may also review the determined outfits and refine and/or modify the recommendations. The outfit combinations may include one or more recommendations and may span multiple events, such as a business trip or holiday. In some embodiments, any items of the outfit that the customer does not have are provided to the customer. For example, the item may be provided to the customer to try and/or purchase and the outfit combination recommendations are provided to help style the provided item using items from the customer's current wardrobe.

At 107, feedback on recommended outfit combinations is received. For example, a customer can provide feedback on whether a recommended outfit was chosen and worn. As another example, a customer can provide feedback on whether the user's style matches a recommendation even if the outfit is not worn. A customer can provide feedback on why an outfit does not match the user's style. In some embodiments, the customer provides feedback on the outfit worn even if the outfit was not recommended. For example, a customer may decide to not wear any of the recommended outfits and selects an outfit of the customer's own choosing. The customer then provides the customer chosen outfit as feedback, for example, via a photo, a text description, a voice description, a video, etc. In some embodiments, the customer selects a recommended outfit but makes modifications to the outfit. For example, the customer may substitute, remove, and/or add different items to a recommended outfit. The customer can provide the changes as feedback for the recommended outfit combination.

In various embodiments, customer feedback on outfit combinations is stored and used to improve the user's preferences and/or context. For example, the feedback may indicate the customer prefers certain types of color combinations and dislikes certain style combinations. As another example, the feedback is used to update the user's catalog of items. For example, the newly worn outfit may include certain clothing, jewelry, and/or accessories, etc. not previously cataloged.

Figure 2:
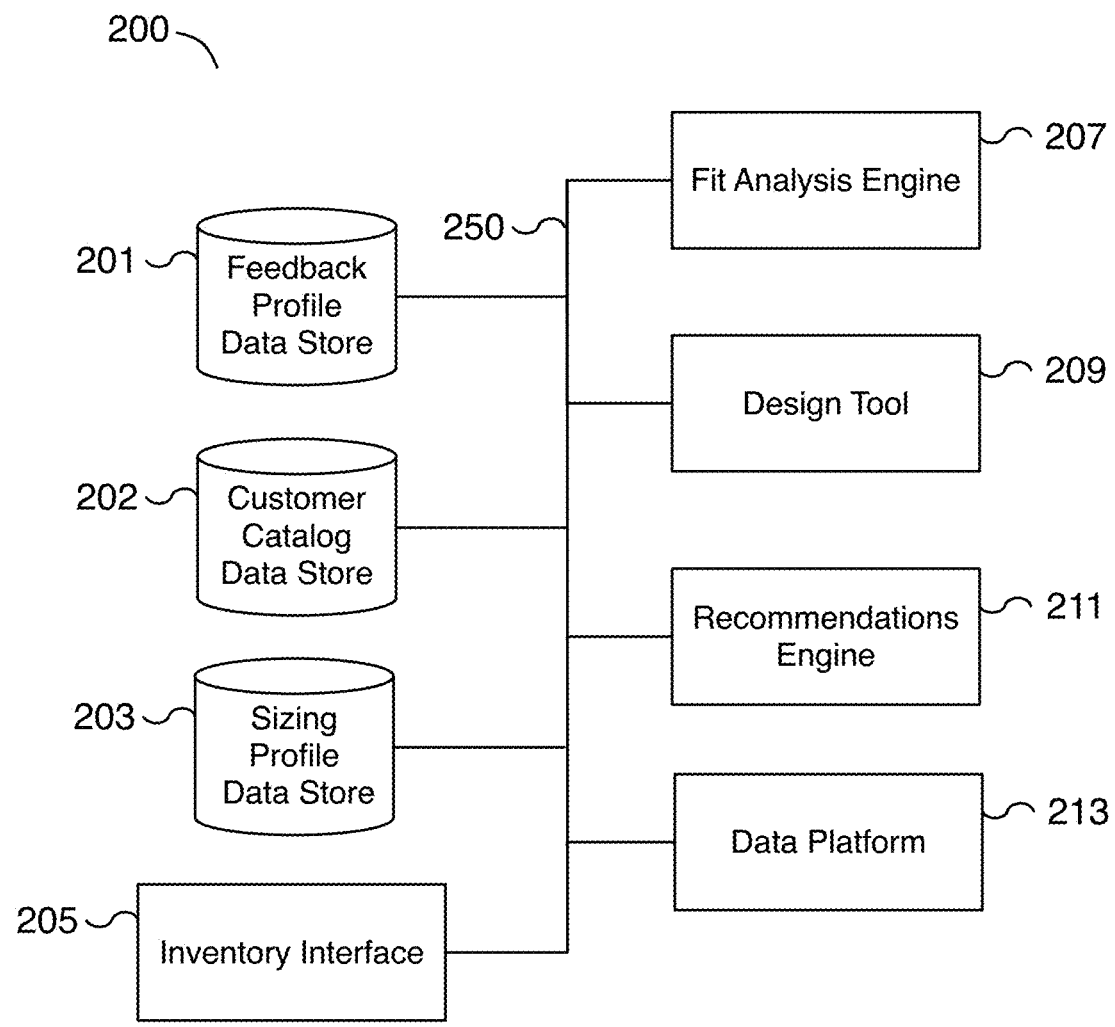
FIG. 2 is a block diagram illustrating an embodiment of a system for providing an outfit combination recommendation using artificial intelligence (AI).

FIG. 2 is a block diagram illustrating an embodiment of a system for providing an outfit combination recommendation using artificial intelligence (AI). The example system 200 shown in FIG. 2 includes feedback profile data store 201, customer catalog data store 202, sizing profile data store 203, inventory interface 205, fit analysis engine 207, design tool 209, recommendations engine 211, and data platform 213. Each of these components may be communicatively coupled via network 250. In some embodiments, the recommendation of outfit combinations utilizes system 200. In some embodiments, system 200 is used to perform the processes described with respect to FIGS. 1 and 3-5.

In the example shown, feedback profile data store 201, customer catalog data store 202, and sizing profile data store 203 may be configured to store information about customers, products, sales data, performance metrics, and machine learning models. In some embodiments, feedback profile data store 201 may be utilized for storing feedback from users or customers related to products, outfit combinations, and outfit combination contexts. Customer catalog data store 202 may be utilized for storing catalogs of items associated with particular customers. And sizing profile data store 203 may be utilized for storing sizing profile data regarding different products such as garments. In some embodiments, feedback profile data store 201, customer catalog data store 202, and/or sizing profile data store 203 may exist as a single unified data store or spread across multiple data stores.

In some embodiments, feedback profile data store 201 stores information including customer or user feedback on size, fit rating, quality, print/style, and price for any test fitted garment or recommended outfit combination. In some embodiments, the feedback includes feedback from a stylist, designer, and/or supplier. In some embodiments, the feedback includes user size measurements, fit challenges, fit preferences, and outfit combination preferences. In various embodiments, the feedback includes a corresponding reference to a garment with sizing profile information in the sizing profile data store. In some embodiments, a garment is referenced using a garment identifier or a stock keeping unit (SKU). Information in feedback profile data store 201 about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market), associated outfit combinations for the item, etc.

In some embodiments, customer catalog data store 202 stores catalog information of items associated with customers. For example, a catalog of physical items associated with each customer may be stored in customer catalog data store 202. In some embodiments, the data for the catalog is provided at 103 of FIG. 1 and may be updated as items are added or removed from the catalog of items for a customer. In some embodiments, the catalog loosely corresponds to the customer's available wardrobe and includes items that may be used to build an outfit combination recommendation.

In some embodiments, sizing profile data store 203 stores sizing profile information including data associated with a product or group of products. In some embodiments, sizing profile information is categorized by product silhouette category. A product silhouette category may be used to define a unique category of garments, such as sport coats, long sleeve tops, short sleeve tops, three-quarter sleeve tops, pull over tops, sleeveless tops, shorts, and jeans, among others. In some embodiments, the garment shape as well as material or construction additionally define a garment silhouette. Examples of material and/or construction include woven, knit, and denim, among others. For each garment, sizing profile information includes measurements for the garment for each garment size. In some embodiments, measurements are taken based on the garment silhouette category and different silhouette categories include different measurements. For example, measurements for a pant silhouette may include a waist, inseam, thigh, front leg opening, and back leg opening measurement, among others. In contrast, measurements for a short sleeve knit top may include a neck opening, shoulder-to-shoulder, chest, sleeve length from armhole, and bicep measurement, among others. Sizing profile information may also include product information such as objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, image, video, or other form of data.

The inventory interface 205 may be configured to store and retrieve inventory information from one or more inventory data stores. In some embodiments, the inventory interface is an interface to one or more local or remote inventory data stores. For example, using the inventory interface, inventory information may be retrieved and/or updated via a vendor hosting one or more inventory data stores remotely. In some embodiments, an inventory data store includes one or more first-party inventory systems hosted either locally or remotely. In some embodiments, inventory data stores may be structured based on warehouses such that each warehouse has a corresponding inventory data store. In some embodiments, different inventory data stores utilize different interfaces, such as different application programming interfaces or query languages. The inventory interface translates inventory requests and updates to and from the components of FIG. 2 using the appropriate inventory data store interface. In various embodiments, inventory information may include garment or product inventory information including a stock keeping unit (SKU), an item type, an item property (e.g., color, pattern, material), a silhouette category, quantity for each product, as well as historical information along with other similar appropriate inventory information.

In various embodiments, the inventory interface is used to access information about how many units of each item are in the inventory. Supply chain information such as how many units of an item have been ordered, when they are expected to be received to replenish a stock of the item, etc. may be accessed via the inventory interface.

The fit analysis engine 207 determines fit analysis for garments by utilizing data from feedback profile data store 201 and sizing profile data store 203. For example, fit analysis engine 207 may be utilized to determine the values for variable size components for a particular garment. In some embodiments, fit analysis engine 207 utilizes data platform 213 to retrieve and/or update data related to feedback, sizing, and/or inventory. Fit analysis engine 207 utilizes data platform 213 to retrieve feedback on sizing from customers and the sizing profile of the garment and/or related garments to determine the applicable variable size components. In some embodiments, fit analysis engine 207 may further utilize data platform 213 to determine the inventory status of one or more garments. For example, when performing fit analysis, fit analysis engine 207 may utilize inventory information, including historical inventory information, to determine the appropriate variable size components.

The design tool 209 may be configured to employ adaptive machine learning to help a designer design garments for the customers according to the customers' tastes. The designed items may be a hybrid of a base garment sized up or down based on variable size components. The design tool 209 may be configured to execute the processes described herein to design a product, where the product incorporates a predicted size fit satisfaction, as further described herein. For example, a designer may use the design tool 209 to create a new garment from a base garment. The selection of one or more values for variable size components may be based on an optimization goal such as increasing the size fit satisfaction. Thus, the garment may be a result of a combination of machine learning/artificial intelligence selected variable size components, where the variable size components are automatically determined to be among the best measurements to meet an optimization goal. For example, values for the variable size components may be ranked according to how well each meets the size fit satisfaction goal.

For example, to at least in part automatically design a product, a system aggregates data collected from a customer, stylist, and/or designer and measurement data from garments. Data platform 213 may build one or more trained models using machine learning processes further described herein. The training data to train the models may be based on behavior and/or feedback of the customer, stylist, and/or the designer as stored over time in the feedback data store, sizing profile information related to garments as stored in the sizing profile data store, and/or an inventory database accessible via the inventory interface. When a designer selects a base garment, one or more sizing goals are selected via the design tool. The fit analysis engine is used to determine values for the variable size components of the base garment to accomplish the sizing goals. The determined variable size components are presented via the design tool to the designer.

In some embodiments, the designer may choose to size up or down the garment. As another example, the designer may choose to size the base garment to another canonical size from a base canonical size. A canonical base size of medium may be used to scale a garment to an extra-small, small, large, extra-large, etc. As another example, the designer may choose to scale a canonical base size to a size variation of the base size within the same canonical size, such as from a medium to a medium-short and/or a medium-tall. As another example, the designer may choose to scale a base garment to a selection of users, such as a cluster of users. The designer specifies the user or group of users as the target audience instead of specifying a size.

In various embodiments, an alternative size for a variable size component may be determined based at least in part on collaborative filtering and/or client segmentation. For example, an alternative size for a component may be selected based on a likelihood that a size would fall into a cluster (e.g., an addressable market). To determine whether a garment with determined size components would fall into a cluster, a set of features making up the garment may be analyzed to determine whether the set would cause the garment to meet a size fit satisfaction goal (e.g., whether it would be an optimal result to the fit analysis). The cluster may be based on feedback such as sizing feedback from the user and sizing measurements obtained from the user's garments.

In some embodiments, design tool 209 may include the functionality to create outfit combinations. For example, an outfit combination may be created by a stylist (and/or customer) by matching different items together. The items may be sourced from one or more inventories to present different options to select from. For example, inventories for different categories of items may be presented including inventories for tops, dresses, bottoms, accessories, footwear, second layer, etc. Other categories or sorting methods for presenting outfit options may be appropriate as well. For example, items may be sorted by season, sizing, fit, material, item type, item function, etc. In various embodiments, the created outfits are used to define a customer's outfit style and/or used to train a machine learning model for recommending outfit combinations. In some embodiments, the outfit combinations created can be utilized as base outfits that can be further modified (e.g., adding, swapping, and/or removing items, etc.) to customize the outfit for a customer or group of customers. In some embodiments, a set of generic outfits are created. For example, the set of generic outfits can cover a wide range of outfit styles and is used to assess a customer's style preferences. Feedback on the set of generic outfits is received from each applicable customer and used to train a new machine learning model targeting that customer's preferences.

The recommendations engine 211 may be configured to employ adaptive machine learning to provide recommendations to stylists who select items for customers from an item inventory and/or outfit combination recommendations using customer catalog data. For example, the system may use a machine learning trained model to score products and/or outfit combination recommendations. The top scoring products/outfits may be provided to the stylist. The stylist (e.g., a human) then selects one or more of the top scoring products/outfits to be offered to a customer. For a selected product, the customer may purchase/keep the product and/or provide feedback about the product. For a selected outfit combination, the customer may provide feedback on the outfit combination such as whether the outfit matches the customer's style. The importance of a well-matched outfit combination is significant since a well-selected outfit combination may impact the customer's decision to purchase the product. A recommended outfit combination provides the customer the other items to wear the selected product with and demonstrates to the customer how to integrate the selected product into the customer's existing wardrobe. The customer's feedback may be used to improve the machine learning training models and may be stored in feedback profile data store 201 and/or customer catalog data store 202. In various embodiments, recommendations engine 211 may be configured to perform the processes described herein, e.g., the processes shown in FIGS. 1 and 3-5, to provide an outfit combination recommendation using customer catalog data from customer catalog data store 202.

The data platform 213 may be configured to coordinate operation of feedback profile data store 201, customer catalog data store 202, sizing profile data store 203, inventory interface 205, fit analysis engine 207, design tool 209, and recommendations engine 211. For example, when data is generated by interaction of a customer, stylist, designer, and/or supplier with system 200, the data platform 213 may determine what information is to be stored and where. For example, data platform 213 may store the feedback data in feedback profile data store 201, customer catalog data in customer catalog data store 202, and sizing profile data in sizing profile data store 203. The data platform 213 may also store the data as part of a training data set for machine learning as further described herein. As another example, when measurement data is received for different garments, data platform 213 may store the measurement data as a sizing profile in sizing profile data store 203. As a further example, data platform 213 may determine to store inventory related data using inventory interface 205. For example, in the event the inventory count for a particular garment needs to be retrieved, data platform 213 may determine that inventory interface 205 is the appropriate component from which to retrieve the information. Data platform 213 may direct the request for inventory updates to inventory interface 205. In various embodiments, data platform 213 may be communicatively coupled to feedback profile data store 201, customer catalog data store 202 sizing profile data store 203, inventory interface 205, fit analysis engine 207, design tool 209, and recommendations engine 211. In some embodiments, data platform 213 includes a network interface (not shown) for communicating with remote devices such as computer system 600 of FIG. 6. Data platform 213 can be used to provide recommendations such as product and outfit combinations to a customer via the customer's mobile device or another appropriate manner.

Figure 4:
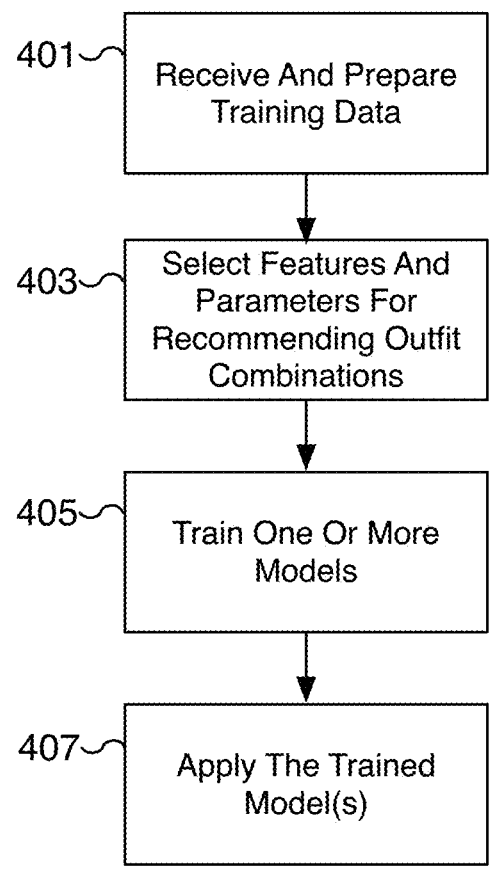
FIG. 4 is a flow chart illustrating an embodiment of a process for machine learning to train one or more prediction models.

In some embodiments, machine learning models, for example, utilized by recommendations engine 211, may include trained models generated from a machine learning process such as the process of FIG. 4. Trained models may be categorized by type such as feedback models, sizing profile models, inventory models, variety models, etc. For each category of model, a model may be generated for each of one or more segments such as segments based on one or more of the following: a target body type, a target seasonality, a target fiscal quarter, a target customer type or business line (e.g., women, men, children, petite, plus, maternity), a target age grouping, a target lifestyle, a target product type (e.g., blouse, dress, pants), a target style (e.g., edgy, urban, Pacific Northwest), an outfit combination category, a garment silhouette, etc. A model may correspond to a particular segment such as a client segment, time period, etc. For example, a first model may be for the sales performance of a product for a group of customers with a first body type such as petite and a second model may be for the sales performance of a product for a group of customers with a second body type such as tall.

In some embodiments, a trained machine learning model can be utilized to predict a value for an outfit combination. The model may be trained using past customer feedback data on outfit combinations and may utilize feedback on garment fit and sizing profile information of the garment. The outfit combination results along with the outfit style preferences are incorporated into the training corpus to predict a value for an outfit combination. The training corpus may be trained based on a selected target category.

In some embodiments, feedback profile data store 201, customer catalog data store 202, sizing profile data store 203, inventory interface 205, fit analysis engine 207, design tool 209, recommendations engine 211, and data platform 213 may be configured to perform the processes described herein, e.g., the processes shown in FIGS. 1 and 3-5. In some embodiments, the components of FIG. 2 may be communicatively coupled to one another to perform the processes shown in FIGS. 1 and 3-5 on input received at recommendations engine 211.

Figure 3:
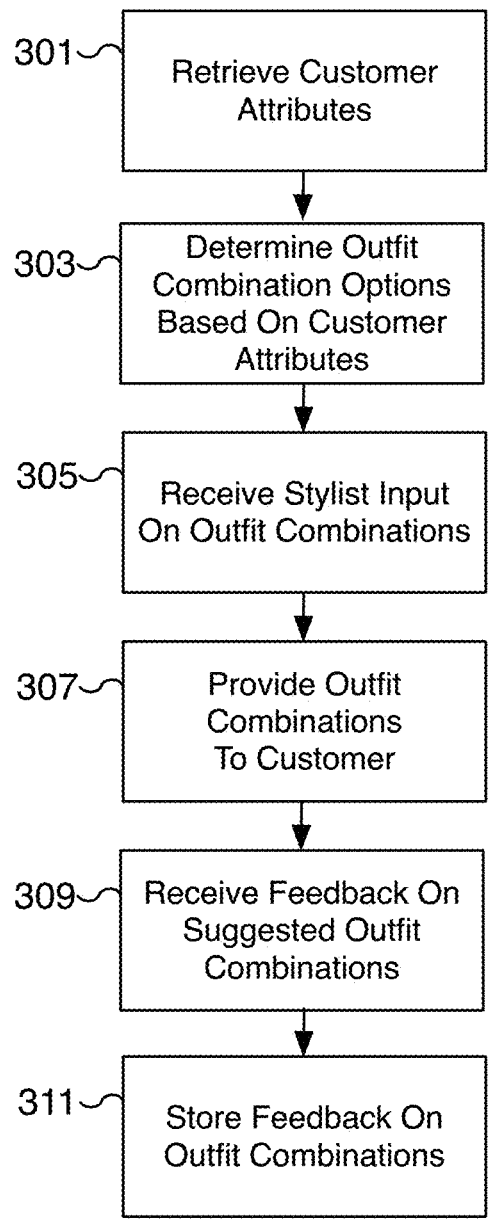
FIG. 3 is a flow chart illustrating an embodiment of a process for providing an outfit combination recommendation using artificial intelligence (AI).

FIG. 3 is a flow chart illustrating an embodiment of a process for providing an outfit combination recommendation using artificial intelligence (AI). For example, using customer attributes including style preferences, a recommended outfit combination is determined and suggested to a customer based on the customer's catalog of items. The process of FIG. 3 may be at least in part implemented on one or more components of system 200 shown in FIG. 2. For example, the process may be performed by utilizing recommendation engine 211 with respect to feedback profile data store 201 and customer catalog data store 202. In some embodiments, the process of FIG. 3 is performed at least in part by processor 601 of FIG. 6. For example, the computer system of FIG. 6 may rely on a recommendation engine such as the recommendation engine 211 of FIG. 2 to provide outfit combination recommendations that are then displayed on display 611 of the computer system of FIG. 6. In various embodiments, the recommendation engine may be local or remote to the computer system of FIG. 6. In some embodiments, the step of 301 is performed at 101 and/or 103 of FIG. 1, the steps of 303, 305, and/or 307 are performed at 105 of FIG. 1, and/or the steps of 309 and/or 311 are performed at 107 of FIG. 1.

At 301, a customer's attributes are retrieved. A customer's attributes may include objective attributes such as biographical information and sizing measurements. Customer attributes may include subjective attributes such as preferences for outfit combinations, style, fit, colors, designers/brands, budget, etc. For example, a customer may rate specific styles, outfit combinations, prints, and/or attributes including those products in an inventory and products from other providers. A customer's attributes include sizing attributes such as the customer's sizes, measurements, fit challenges, and/or fit preferences. The information may be collected through third party apps or platforms such as apps that allow a user to indicate interests and/or share interest in products with other users. Customer attributes may be collected when a customer enrolls with the system. For example, the customer may complete a survey about his or her measurements (height, weight, etc.), lifestyle, and preferences. This information may be stored to a customer profile. Customer feedback including sizing and outfit combination feedback may be stored in a feedback data store such as feedback profile data store 201 of FIG. 2. Customer attributes may be determined from social media and content created or curated by the customer on third party platforms such as Pinterest®, Instagram®, Facebook®, LinkedIn®, and the like. In some embodiments, customer attributes include a catalog of items owned by or available to the customer and/or part of the customer's wardrobe. The catalog of items may be stored in a customer catalog data store such as customer catalog data store 202 of FIG. 2.

When the customer makes purchases and provides feedback on products, customer attributes may be updated. For example, the customer profile and feedback may be updated. The customer may provide feedback in various formats including completing surveys, writing product reviews, making social media posts, and the like regarding one or more products. Products and outfit combinations recommended to the customer may be adapted to a customer's changing attributes and taste. In one aspect, the customer's taste may be learned over time by a computer system and/or stylist. Customers may also provide sizing feedback. For example, an item may fit too large, too small, or perfectly. As another example, an item may have sleeves that are too long. In one aspect, the customer's sizing may be learned over time by a computer system and/or stylist.

In various embodiments, customer attributes may be determined based on generalizations about other users who share characteristics with a particular customer. Generalizations about groups of customers may be made from individual customer attributes. Customers may be grouped by any characteristic, including gender, body type, shared preference (e.g., a measure of similarity between clients such as clients' objective, subjective, and/or sizing attributes or learned similarity in product preferences), and the like.

At 303, outfit combination options are determined based on the customer attributes. The outfit combination options may be determined by processing the customer attributes to select a subset of outfit combinations based on the customer's catalog of items. The outfit combination options may be provided to stylists. In various embodiments, instead of directly offering all of the outfit combination options to the customer, a stylist first selects outfit combinations from among the outfit combination options to provide to the customer. In various embodiments, the outfit combination options are determined in part based on a predicted outfit combination ranked match score. For example, a predicted outfit combination ranked match score between an outfit combination and the customer is determined using a trained machine learning model. The predicted outfit combination ranked match score may be used to rank the outfit combination amongst other outfit combinations. The ranked order of suggested outfit combinations may be provided to the customer or a stylist. In some embodiments, the ranked match score indicates how strongly the customer likes the outfit and/or the likelihood the user will purchase or retain the items of the outfit combination.

In various embodiments, a plurality of models are trained and each model corresponds to a respective performance metric. For example, a sales model is trained to determine a sales metric, an inventory model is trained to determine an inventory metric, and rating models may be used to determine style rating, size rating, fit rating, quality rating, retention score, personalization score, style grouping rating, and price value rating, among others. The models may be trained with training data sets, where the training data sets correspond to particular categories and segments. In various embodiments, a match score model is trained to determine a match score metric, such as the match score used to determine outfit combination options.

At 305, stylist input on outfit combinations is received. A stylist (e.g., a human reviewer) selects an outfit combination selection from the outfit combination options. The outfit combination selection may then be recommended to a customer. Suppose the weather indicates rain and rain gear is included in the outfit combinations. One or more outfit combinations incorporating raincoats and rain boots may be automatically selected based on the customer's attributes. Instead of providing all outfit combination options directly to a customer, a stylist selects a sub-set of outfit combinations to offer to the customer, for example, rain outfits with dresses instead of pants. Statistics about the outfit combination selection such as how frequent a customer wears a similar outfit or items of the outfit, similar outfits related to the outfit combination, etc. can be provided to the stylist. In various embodiments, the stylist utilizes the additional information to include or exclude a recommended outfit combination as part of the outfit combination selection. In some embodiments, the stylist may modify the outfit combination to add, subtract, and/or change items of the outfit. For example, the stylist may swap a pair of shoes or add additional jewelry. As another example, the stylist may add a scarf or umbrella.

In various embodiments, a human stylist is informed of the outfit combination options with the addition of retention metrics such as a likelihood of the customer to purchase future products or to continue to receive future outfit combination recommendations. A human stylist may use the overall likelihood metric to inform the stylist's selection of outfit combinations for a customer. By ranking potential options using the determined metrics and providing inferred purchase information, a stylist is able to make a more informed selection for her or his customer. The stylist can incorporate her or his human expertise on style, sizing, fit, etc. with quantified metrics determined using artificial intelligence and machine learning. The final outfit combination selection is influenced both by the uniquely human qualities of the stylist, such as the stylist's expertise and the stylist's relationship and understanding of the customer, as well as data science based on past purchase decisions and feedback of collective customers.

At 307, outfit combinations are provided to a customer. One or more outfit combinations are provided as suggested outfits for the customer to wear. The outfit combinations may be provided via text message, email, a mobile app, a messaging platform, a web interface, a smart home device such as a smart television, a social media feed, or another delivery mechanism. In various embodiments, high-resolution images and/or video of the outfit combination are provided. In some embodiments, the outfit is rendered in three-dimension on a three-dimensional model of the customer. The rendering depicts how the outfit looks and drapes on the customer's body. The outfit combination can be viewed from multiple perspectives such as from the front, side, back, etc. In some embodiments, the user can manipulate the model of the customer wearing the outfit combination to see the outfit from different angles and zoom settings. In various embodiments, the user may share the outfit with others such as friends and family, for example, to gather feedback from others on the outfit.

At 309, feedback on the suggested outfit combinations is received. The feedback may include feedback on how well received the recommended outfit combinations are by the customer. For example, the customer may like or not like a recommended outfit combination. Feedback may also be provided using a finer granularity such as the customer liked the overall outfit but not one of the items. The feedback may also specify what about the item the user would like changed. In various embodiments, the amount and type of feedback can differ and can be provided in different formats including completing surveys, writing product reviews, making social media posts, and the like. The feedback may be stored and associated with the customer and/or the outfit combination.

At 311, feedback on the provided outfit combinations is stored. For example outfit combination feedback information may be stored in a database such as feedback profile data store 201 of FIG. 2. As another example, feedback on a customer's catalog of items may be stored in a catalog database such as customer catalog data store 202 of FIG. 2. In some embodiments, the information stored includes style feedback, fit challenges, and/or fit preferences of the customer as related to an outfit combination. The information about a customer's style and/or outfit combination preference may be extracted to learn and predict over time by a computer system and/or stylist the outfit combinations for a customer and/or group of customers. In some embodiments, the stored information is used to train one or more machine learning models as described with respect to FIG. 4. In various embodiments, product item feedback is stored using an associated identifier or a stock keeping unit (SKU) and customer feedback is stored using an associated customer identifier.

FIG. 4 is a flow chart illustrating an embodiment of a process for machine learning to train one or more prediction models. The process of FIG. 4 may be at least in part implemented on one or more components of system 200 shown in FIG. 2. In some embodiments, the process of FIG. 4 is performed at least in part by processor 601 of FIG. 6. In some embodiments, the models trained using the process of FIG. 4 are utilized by the processes of FIGS. 1, 3, and/or 5.

At 401, training data is received and prepared. In some embodiments, training data is customer data on outfit combination feedback data, sizing feedback data, style data, garment preference data, or other appropriate data. In some embodiments, outfit combination and/or sizing feedback data is retrieved from a feedback data store such as feedback profile data store 201 of FIG. 2. The outfit combination feedback includes feedback from users who have been recommended a particular outfit combination. The outfit combination feedback may include outfit combination preferences such as preferred style preferences and/or sample outfit combinations created by customers and/or stylists. The sizing feedback data includes sizing information from users who have tested a particular garment. The sizing feedback data may include user size attributes, user sizing ratings, and user fit ratings. In some embodiments, user size attributes include size measurements, fit challenges, and fit preferences of the user. In various embodiments, the feedback data includes garment identifiers, such as a stock keeping unit (SKU), for preparing the data and merging the feedback data with customer catalog data and/or sizing profile data.

In some embodiments, data collected includes additional data such as outfit style preferences, style properties of products, and/or past outfit selection information, among other relevant outfit selection data. By utilizing features such as outfit style preferences, style properties, and past outfit selection information, a machine learning model can be trained to predict the likelihood a customer with a particular outfit style preference will select an outfit combination recommendation with particular outfit style properties. For example, certain customers may prefer a particular blouse paired with skirts while other customers may prefer the same blouse paired with dress pants.

In various embodiments, the data collected is prepared. For example, the user feedback data for a particular outfit combination is collected, merged, and prepared into a training data for a training corpus. In some embodiments, the data is prepared into a training data set and a validation set. Thus a portion of the data is utilized for training and a separate portion is utilized for validating the training results. In some embodiments, the data is prepared based on segmented target categories. For example, users are segmented into different target categories based on customer attributes. In some embodiments, the target categories are selected by identifying clusters of customers with similar attributes or defining features. By segmenting the users into target categories, a machine learning model can be trained for each segmented target category. This improves the scalability of the solution and vastly increases the size and quantity of the training data. In various embodiments, each segmented target category corresponds to a different user segment. Data is aggregated from users of the user segment for use in training a machine learning model targeting the particular user segment.

In some embodiments, different prediction models can be trained for different prediction model categories or segments. To train each of the different models, different sets of training data can be gathered specifically for different models to be trained. For example, past data associated with outfit combinations to be predicted for a particular target user category, for example a category based on the age and gender of the customer, is gathered. Different models of the particular target user category may be trained for each of the various different segments of the category.

At 403, supervised machine learning features and parameters are selected for recommending outfit combinations. For example, a user may set control parameters for various machine learning algorithms to be used to train a model. The selection of the features refers to the selection of machine learning features or individual identifiable properties associated with an outfit combination, item, preference, sizing property, etc. The features and parameters may be selected based on objectives for the trained model. The selection of features to be utilized in prediction models can be defined at least in part by a human user or at least in part by automatically being determined. For example, a human or artificial intelligence may define features of the prediction models to be trained.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer outfit combination styles and ratings. For example, a customer may provide feedback (e.g., text) when they receive an outfit combination recommendation. The feedback provided by the customer may be processed with NLP techniques to extract features. NLP techniques include rule-based engines, clustering, and classification to make determinations about characteristics of an outfit that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features. Features that predict an outfit combination can then be related back to representative styles to communicate the concept to designers, stylists, and/or manufacturers.

At 405, one or more machine learning models are trained using the training data prepared at 401. In supervised machine learning, training data may be utilized to train a prediction model to perform predictions based on information "learned" from the training data. In some embodiments, more than one machine learning model is trained. For example, models may be trained by target customer type or business line (e.g., women, men, children), target lifestyle, target style (e.g., edgy, urban, Pacific Northwest), target body type, target seasonality, target fiscal quarter, etc. Different client segments may be used to categorize the model types depending on the optimization goal.

In some embodiments, one or more trained models may be used to determine a match score corresponding to the likelihood a particular customer will select (or have a positive reaction to) a recommended outfit combination. In some scenarios, a single model is used to determine the match score. In other scenarios, multiple models are used to determine the match score. In various embodiments, the match score utilizes features such as customer outfit combination preferences, outfit style preferences, sizing preferences, fit issues, garment sizing, etc. In some embodiments, an outfit combination desirability prediction value corresponds to a match score for a customer and particular outfit combination.

In various embodiments, the model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a recommended outfit combination may have an aspect that makes the combination perform better than expected. For example, the recommended outfit combination may perform better, such as fit better, than predicted by a trained model. The description of the factor for success is an aspect. This aspect can be leveraged by incorporating the aspect into new outfit combination recommendations.

At 407, the trained machine learning model(s) are applied. In some embodiments, for each model type, multiple versions of the model exist. As additional data is collected and prepared, new versions of the model are trained and prepared for production use. For example, as customers provide feedback on new outfit combinations, additional feedback information is collected for the outfit and added to a training set for the customer's target category. Training with the additional data allows for a more accurate training model. In some embodiments, once a model has been validated, the model is transferred to a production system and utilized with a machine learning engine for use in predicting a match score. For example, a trained machine learning model is transferred into a machine learning engine, such as recommendation engine 211 of FIG. 2 for generating outfit combination recommendations. In some embodiments, a trained machine learning model is used to infer outfit combination desirability prediction values. The machine learning model applied may be one of multiple available machine learning models and is selected for use based on the user segment corresponding to the target customer. In some embodiments, the step of 407 is performed at 105 of FIG. 1, at 303 of FIG. 3, and/or at 509 of FIG. 5. In some embodiments, the trained machine learning model is applied using a processor such as processor 601 of FIG. 6.

Figure 5:
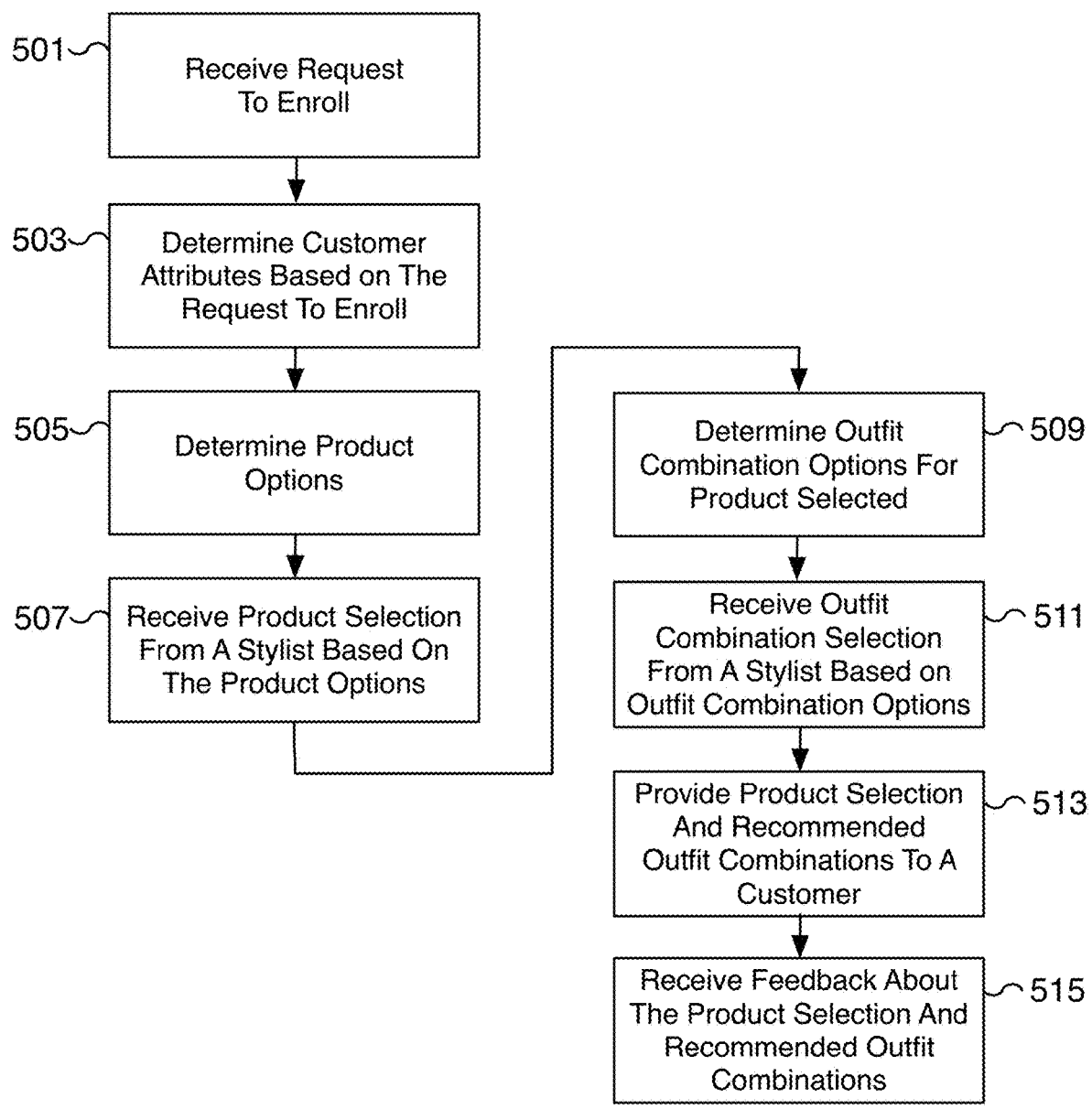
FIG. 5 is a flow chart illustrating an embodiment of a process for selecting and providing products and outfit combination recommendations.

FIG. 5 is a flow chart illustrating an embodiment of a process for selecting and providing products and outfit combination recommendations. In some embodiments, products are selected and provided to a customer along with recommendations for outfit combinations that utilize the selected products paired with items already available to the customer. In various embodiments, the recommended outfit combinations utilize the processes described herein. The process of FIG. 5 may be performed using computer system 600 by processor 601 of FIG. 6 and/or may be at least in part implemented on one or more components of system 200 shown in FIG. 2. For example, the process may be performed by utilizing fit analysis engine 207, design tool 209, recommendations engine 211, and data platform 213 with respect to feedback profile data store 201, customer catalog data store 202, sizing profile data store 203, and inventory interface 205. Using the process of FIG. 5, a product can be suggested to a customer based at least on the customer's sizing properties, style preferences, product inventory, and stylist selection along with recommended outfit combinations based on the customer's outfit combination preferences and context with input from a stylist. In some embodiments, the step of 503 is performed at 101 and/or 103 of FIG. 1 and/or 301 of FIG. 3, the step of 509 is performed at 105 of FIG. 1 and/or 303 of FIG. 3, the step of 511 is performed at 105 of FIG. 1 and/or 305 of FIG. 3, the step of 513 is performed at 105 of FIG. 1 and/or at 307 of FIG. 3, and/or the step of 515 is performed 107 of FIG. 1 and/or at 309 and/or 311 of FIG. 3.

At 501, a request to enroll is received. The request to enroll may be received from a potential customer requesting recommendations and/or products. The customer may be enrolled with a product selection and distribution system such as the system of FIG. 2. Upon enrollment, the potential customer becomes a customer and information about the customer may be stored including a catalog of customer items. Products may be provided to the customer once or on a recurring/subscription basis. Products may be selected for a customer based on the customer's preferences, including style and sizing profile, which may be learned over time. To ensure the selected products are compatible with the customer's existing wardrobe and to improve the retention/purchase rate of the provided products, outfit combination recommendations may be provided that pair the provided products with the customer's existing wardrobe. As part of enrollment, the customer may provide information about his or her preferences including outfit preferences and existing wardrobe. For example, the customer may provide information directly or indirectly. The information may be provided through a personalized app or third party styling or messaging platforms. This information may be stored in a database such as feedback profile data store 201, customer catalog data store 202, or sizing profile data store 203 of FIG. 2.

At 503, customer attributes are determined based on the request to enroll.

Customer attributes may include objective attributes such as biographical information and sizing measurements. Customer attributes may include subjective attributes such as preferences for style, outfit combinations, fit, colors, designers/brands, budget, etc. For example, a customer may rate specific styles, outfit combinations, prints, and/or attributes including those products in an inventory and products from other providers. A customer's attributes may include sizing attributes such as the customer's sizes, measurements, fit challenges, and/or fit preferences. The information may be collected through third party apps or platforms such as apps that allow a user to indicate interests and/or share interest in products with other users. Customer attributes may be collected when a customer enrolls with the system. For example, the customer may complete a survey about his or her measurements (height, weight, etc.), lifestyle, preferences, existing wardrobe, recent purchases, etc. This information may be stored to a customer profile. Customer feedback may be stored in a feedback data store such as feedback profile data store 201 of FIG. 2 and customer catalog information may be stored in a catalog data store such as customer catalog data store 202 of FIG. 2. Customer attributes may be determined from social media and content created or curated by the customer on third party platforms such as Pinterest®, Instagram®, Facebook®, LinkedIn®, and the like.

When the customer makes purchases and provides feedback on products, customer attributes may be updated. For example, the customer profile, feedback, and catalog may be updated. The customer may provide feedback in various formats including completing surveys, writing product reviews, making social media posts, and the like regarding one or more products. Products and outfit combinations recommended to the customer may be adapted to a customer's changing attributes and taste. In one aspect, the customer's taste may be learned over time by a computer system and/or stylist. Customers may also provide sizing feedback. For example, an item may fit too large, too small, or perfectly. As another example, an item may have sleeves that are too long. In one aspect, the customer's sizing may be learned over time by a computer system and/or stylist.

In various embodiments, customer attributes may be determined based on generalizations about other users who share characteristics with a particular customer. Generalizations about groups of customers may be made from individual customer attributes. Customers may be grouped by any characteristic, including gender, body type, age, shared preference (e.g., a measure of similarity between clients such as clients' objective, subjective, and/or sizing attributes or learned similarity in product preferences), and the like.

At 505, product options are determined based on the customer and global attributes. The product options may be determined by processing the customer attributes to select a subset of products from all products in an inventory. The product options may be determined by applying a machine learning model trained to predict the retention and/or purchase probability in the event a selected product is provided to a customer. In some embodiments, the prediction probability is a match score. Once determined, the product options may be provided to stylists. In various embodiments, instead of directly offering all of the product options to the customer, a stylist first selects products from among the product options to provide to the customer. In various embodiments, the product options are also determined based on global attributes/constraints. For example, a particular product in inventory can only be allocated to one customer. Using global attributes/constraints, the product options for a particular customer take into account whether this customer should be matched with the product instead of other customers.

In various embodiments, the various customer and global attributes utilize one or more models to determine product options and the likelihood a customer will retain or purchase the item. For example, one or more models, such as sales model(s), inventory model(s), variety model(s), rating model(s), predicted size fit model(s), etc. are used. As an example, each trained model may receive as input a feature or combination of features and predict/score a performance metric such as a sales metric, inventory metric, variety metric, style rating, size rating, fit rating, quality rating, retention, personalization, style grouping, and/or price value rating.

In various embodiments, a plurality of models are trained and each model corresponds to a respective performance metric. For example, a sales model is trained to determine a sales metric, an inventory model is trained to determine an inventory metric, and rating models may be used to determine style rating, size rating, fit rating, quality rating, retention score, personalization score, style grouping rating, and price value rating, among others. The models may be trained with training data sets, where the training data sets correspond to particular categories and segments. In various embodiments, a match score model is trained to determine a match score metric, such as the match score used to determine product options.

At 507, a product selection is received from a stylist based on the product options. A stylist (e.g., a human reviewer) selects a product selection from the product options. The product selection may then be offered to a customer. Suppose a customer is looking for blouses. One or more blouses may be automatically selected from the inventory based on the customer's attributes. Instead of providing the blouses directly to a customer, a stylist selects a sub-set of blouses to offer to the customer. Statistics about the product selection such as whether an item was selected to be part of the product selection, when the item was selected to be part of the product selection, for who/what type of customer was the item selected, etc. can be stored. In various embodiments, the stylist may rely on the predicted size fit to select items that are predicted to fit the customer well. Similarly, the stylist may rely on the predicted size fit to exclude items from being selected that are predicted to fit poorly.

In various embodiments, a human stylist is informed of the product options with the addition of purchase metrics such as a likelihood to purchase or desirability prediction metric. For example, the likelihood to purchase metric incorporates a predicted size metric and may incorporate other metrics such as a sales metric, an inventory metric, and metrics based on style, quality, retention, personalization, style grouping, price value, etc. A human stylist may use the overall likelihood to purchase or desirability prediction metric to inform the stylist's selection of products for a customer. By ranking potential options using the determined metrics and providing inferred purchase information for each of the product options, a stylist is able to make a more informed selection for her or his customer. The stylist can incorporate her or his human expertise on style, sizing, fit, etc. with quantified purchasing metrics determined using artificial intelligence and machine learning. The final product selection is influenced both by the uniquely human qualities of the stylist, such as the stylist's expertise and the stylist's relationship and understanding of the customer, as well as data science based on past purchase decisions and feedback of collective customers.

At 509, outfit combination options for the product selection are determined. Using the product selection received at 507, outfit combination options are determined that generate outfit combinations based on the product selection. In various embodiments, the outfit combinations are determined using the processes described herein such as the processes of FIGS. 1, 3, and/or 4 using the system of FIG. 2 and/or the computer system of FIG. 6. In various embodiments, one or more trained machine learning models are used to determine the outfit combination options. The outfit combination options may be provided to stylists. In various embodiments, instead of directly offering all of the outfit combination options to the customer, a stylist first selects outfit combinations from among the outfit combination options to provide to the customer.

At 511, an outfit combination selection is received from a stylist based on the outfit combination options. Similar to step 507 with respect to the product selection, a stylist (e.g., a human reviewer) selects an outfit combination selection from the outfit combination options. The outfit combination selection may then be recommended to a customer with the product selection. Suppose blouses are part of the product selection. One or more blouse outfit combinations may be automatically selected based on the customer's attributes. Instead of providing all blouse outfit combination options directly to a customer, a stylist selects a sub-set of blouse outfit combinations to offer to the customer. Statistics about the outfit combination selection such as how frequent a customer wears a similar outfit or items of the outfit, similar outfits related to the outfit combination, the likelihood a customer will purchase an item of the product selection when recommended along with the outfit combination, etc. can be provided to the stylist. In various embodiments, the stylist utilizes the additional information to include or exclude a recommended outfit combination as part of the outfit combination selection. In some embodiments, the stylist may modify the outfit combination to add, subtract, and/or change items of the outfit. For example, the stylist may swap a pair of shoes or add additional jewelry. As another example, the stylist may add an overcoat.

In various embodiments, a human stylist is informed of the outfit combination options with the addition of purchase metrics such as a likelihood to purchase or a desirability prediction metric of the product selection as influenced by the outfit combination options. A human stylist may use the overall likelihood to purchase or desirability prediction metric to inform the stylist's selection of outfit combinations for a customer. By ranking potential options using the determined metrics and providing inferred purchase information for each of the product options, a stylist is able to make a more informed selection for her or his customer. The stylist can incorporate her or his human expertise on style, sizing, fit, etc. with quantified purchasing metrics determined using artificial intelligence and machine learning. The final outfit combination selection is influenced both by the uniquely human qualities of the stylist, such as the stylist's expertise and the stylist's relationship and understanding of the customer, as well as data science based on past purchase decisions and feedback of collective customers.

At 513, a product selection and recommended outfit combinations are provided to a customer. A shipment of items may be provided to a customer. The customer may then decide to keep or return one or more of the items in the shipment. In some embodiments, in the event the customer decides to retain an item, then the customer purchases the item. Statistics about the items such as whether they were kept or returned, when they were kept or returned, and/or who/what type of customer kept or returned the item, among others can be stored. Included with the product selection are outfit combination recommendations that pair the items of the product selection with items the customer already has available.

At 515, feedback about the product selection and recommended outfit combinations is received. A customer may provide feedback about the product selection such as reasons why the customer is keeping or not keeping one or more items in the product selection. In various embodiments, a customer provides sizing feedback and style feedback on the product selection provided in 513. For example, the customer may provide feedback indicating a blouse is too loose or too tight in the chest. As another example, a customer may provide feedback that a pair of jeans fits perfectly. Feedback may be provided using a coarse granularity such as too large, too small, or fits perfectly. Feedback may also be provided using a finer granularity such as the thigh opening is too tight or the sleeves are too short by two inches. The feedback may be provided by the customer in various formats including completing surveys, writing product reviews, making social media posts, and the like. In various embodiments, the feedback may be used to design or purchase products that might appeal to a particular customer base or meet optimization goals. The feedback may also include feedback on the recommended outfit combinations. For example, the customer may like or not like a recommended outfit combination. Feedback may also be provided using a finer granularity such as the customer liked the overall outfit but not one of the items. The feedback may also specify what about the item the user would like changed. In various embodiments, the amount and type of feedback can differ and can be provided in different formats as described above.

In various embodiments, the information about the product selection and/or recommended outfit combinations is stored. For example, sizing information may be stored in a database such as feedback profile data store 201 or sizing profile data store 203 of FIG. 2. As another example, customer catalog information may be stored in a catalog database such as customer catalog data store 202 of FIG. 2. In some embodiments, the information stored includes style feedback, fit challenges, and/or fit preferences of the customer. The information about a customer's style preference, outfit combination preference, sizing, and/or a product item's sizing may be extracted to learn and predict over time by a computer system and/or stylist the product items and outfit combinations for a customer and/or group of customers. In some embodiments, the stored information is used to train one or more machine learning models as described with respect to FIG. 4. In various embodiments, product item feedback is stored using an associated identifier or a stock keeping unit (SKU) and customer feedback is stored using an associated customer identifier.

Figure 6:
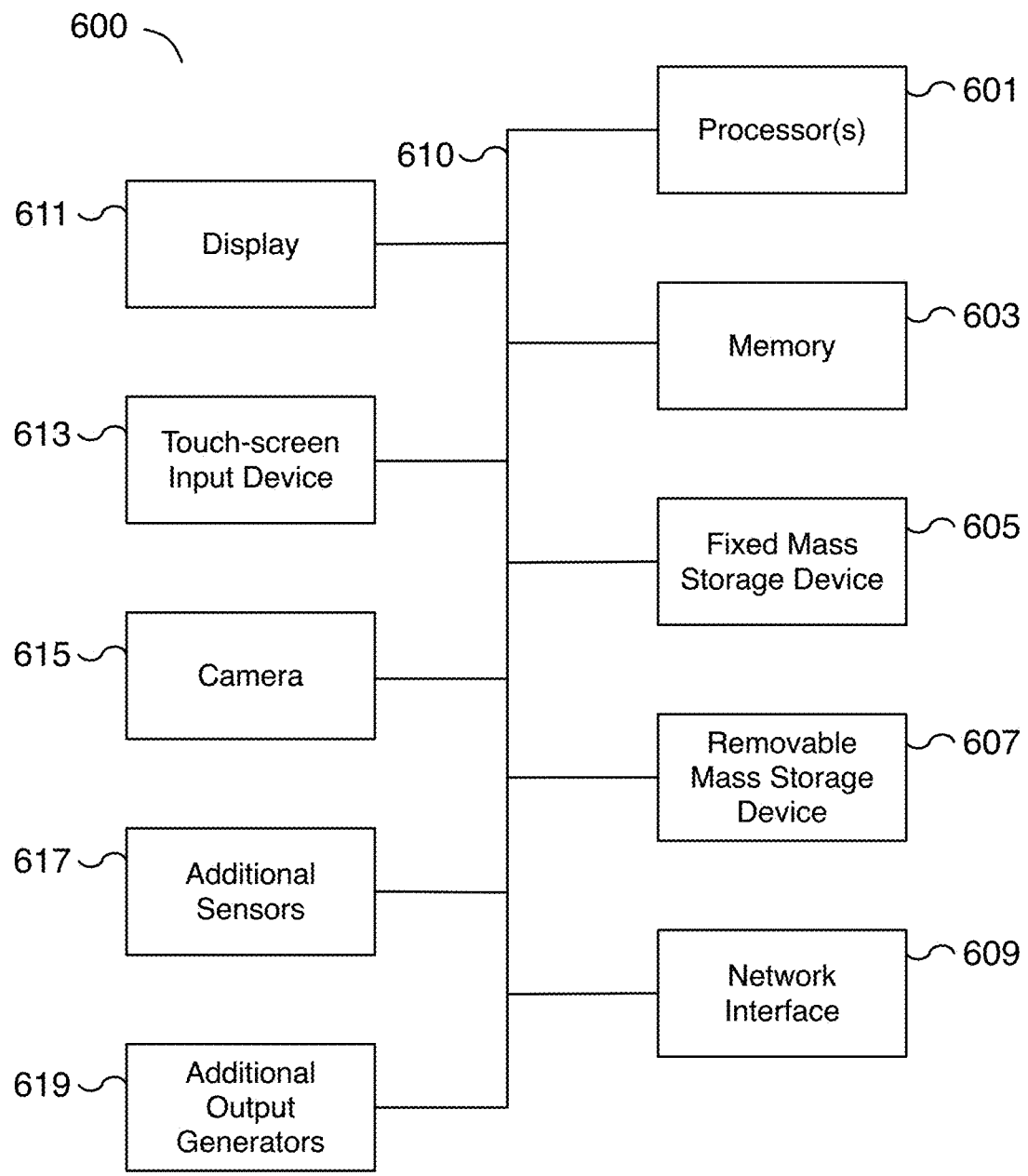
FIG. 6 is a functional diagram illustrating a programmed computer system for providing an outfit combination recommendation using artificial intelligence (AI).

FIG. 6 is a functional diagram illustrating a programmed computer system for providing an outfit combination recommendation using artificial intelligence (AI). For example, a programmed computer system may be a mobile device, such as a smartphone device, a tablet, a kiosk, a laptop, a smart television, and/or another similar device for capturing and submitting outfit images of a customer and/or providing indications of recommended outfit combinations to a customer. As will be apparent, other computer system architectures and configurations can be used. Computer system 600, which includes various subsystems as described below, includes at least one microprocessor subsystem (also referred to as a processor or a central processing unit (CPU)) 601. For example, processor 601 can be implemented by a single-chip processor or by multiple processors. In some embodiments, processor 601 is a general purpose digital processor that controls the operation of the computer system 600. Using instructions retrieved from memory 603, the processor 601 controls the reception and manipulation of input data, and the output and display of data on output devices (e.g., display 611). In some embodiments, processor 601 includes and/or is used to provide functionality for providing an outfit combination recommendation using a trained machine learning model. In some embodiments, processor 601 is used to perform at least part of the processes described with respect to FIGS. 1 and 3-5.

Processor 601 is coupled bi-directionally with memory 603, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 601. Also as is well known in the art, primary storage typically includes basic operating instructions, program code, data, and objects used by the processor 601 to perform its functions (e.g., programmed instructions). For example, memory 603 can include any suitable computer-readable storage media, described below, depending on whether, for example, data access needs to be bi-directional or uni-directional. For example, processor 601 can also directly and very rapidly retrieve and store frequently needed data in a cache memory (not shown).

A removable mass storage device 607 provides additional data storage capacity for the computer system 600, and is coupled either bi-directionally (read/write) or uni-directionally (read only) to processor 601. For example, removable mass storage device 607 can also include computer-readable media such as flash memory, portable mass storage devices, magnetic tape, PC-CARDS, holographic storage devices, and other storage devices. A fixed mass storage 605 can also, for example, provide additional data storage capacity. Common examples of mass storage 605 include flash memory, a hard disk drive, and an SSD drive. Mass storages 605, 607 generally store additional programming instructions, data, and the like that typically are not in active use by the processor 601. Mass storages 605, 607 may also be used to store user-generated content and digital media for use by computer system 600. It will be appreciated that the information retained within mass storages 605 and 607 can be incorporated, if needed, in standard fashion as part of memory 603 (e.g., RAM) as virtual memory.

In addition to providing processor 601 access to storage subsystems, bus 610 can also be used to provide access to other subsystems and devices. As shown, these can include a network interface 609, a display 611, a touch-screen input device 613, a camera 615, additional sensors 617, additional output generators 619, as well as an auxiliary input/output device interface, a sound card, speakers, additional pointing devices, and other subsystems as needed. For example, an additional pointing device can be a mouse, stylus, track ball, or tablet, and is useful for interacting with a graphical user interface. In the example shown, display 611 and touch-screen input device 613 may be utilized for displaying a graphical user interface for providing a graphical representation of an outfit combination recommendation to a customer and/or capturing and submitting photos/videos of outfit combinations worn by the customer. In some embodiments, camera 615 and/or additional sensors 617 include a depth sensor for capturing depth information along with image data.

The network interface 609 allows processor 601 to be coupled to another computer, computer network, telecommunications network, or network device using one or more network connections as shown. For example, through the network interface 609, the processor 601 can transmit/receive outfit combination recommendations and/or captured and submitted images/video of a customer's selected outfit combination including modifications to recommended outfit combinations. The user can also submit wardrobe information to catalog a customer's items. In some embodiments, network interface 609 allows processor 601 to communicate with a recommendation engine such as recommendation engine 211 of system 200 of FIG. 2. Further, through the network interface 609, the processor 601 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 601 can be used to connect the computer system 600 to an external network and transfer data according to standard protocols. For example, various process embodiments disclosed herein can be executed on processor 601, or can be performed across a network such as the Internet, intranet networks, or local area networks, in conjunction with a remote processor that shares a portion of the processing. In some embodiments, network interface 609 utilizes wireless technology for connecting to networked devices such as system 200 of FIG. 2. In some embodiments, network interface 609 utilizes a wireless protocol designed for short distances with low-power requirements. In some embodiments, network interface 609 utilizes a version of the Bluetooth protocol. Additional mass storage devices (not shown) can also be connected to processor 601 through network interface 609.

An auxiliary I/O device interface (not shown) can be used in conjunction with computer system 600. The auxiliary I/O device interface can include general and customized interfaces that allow the processor 601 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 610 is illustrative of any interconnection scheme serving to link the subsystems. Other computer architectures having different configurations of subsystems can also be utilized.

Figure 7:
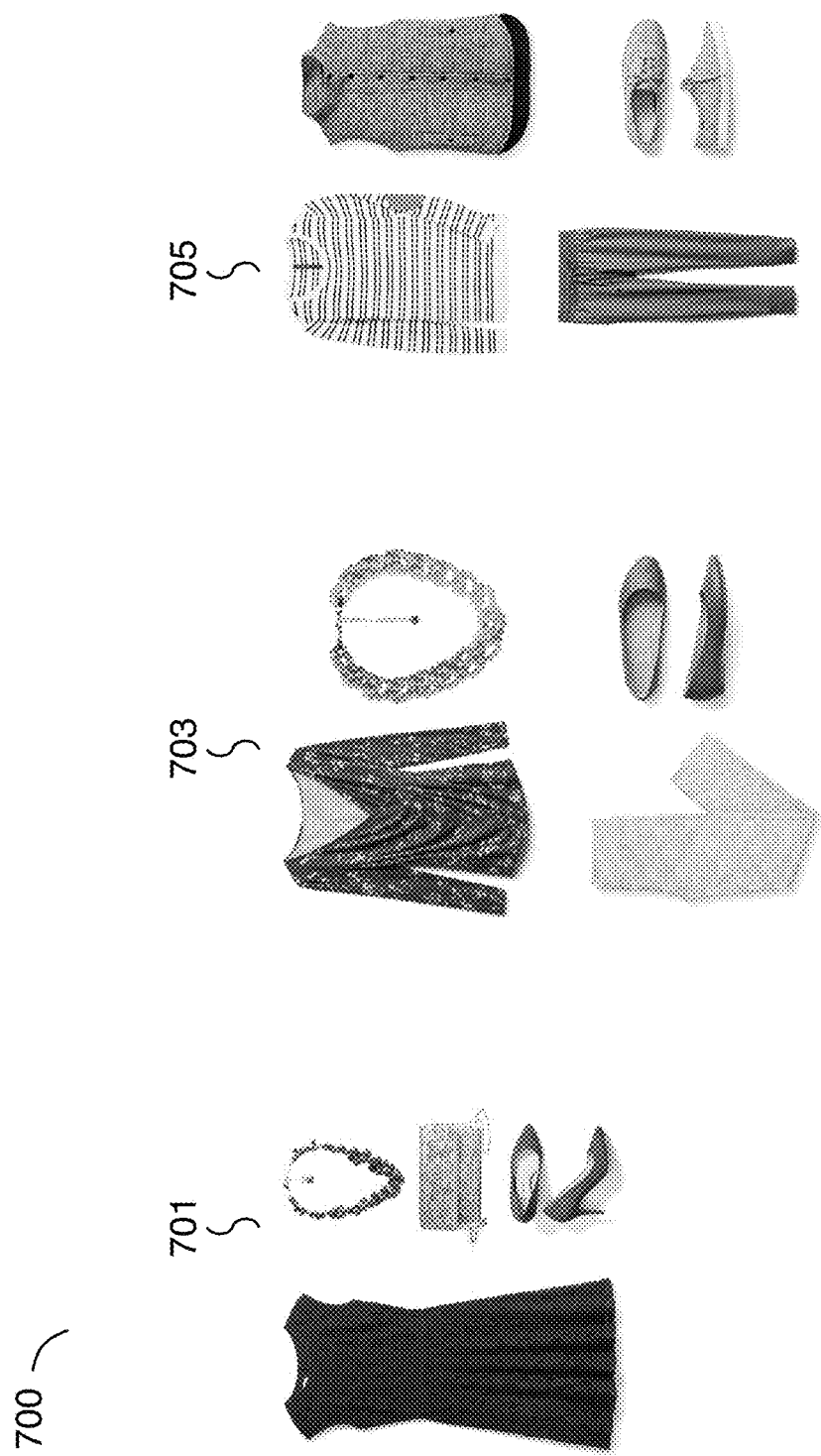
FIG. 7 is a diagram illustrating recommended outfit combinations generated by an embodiment of a process for providing outfit combination recommendations using artificial intelligence (AI).

FIG. 7 is a diagram illustrating recommended outfit combinations generated by an embodiment of a process for providing outfit combination recommendations using artificial intelligence (AI). In the example shown, recommendations 700 include recommended outfit combinations 701, 703, and 705. In various embodiments, recommended outfit combinations 701, 703, and 705 may be generated using the processes of FIGS. 1, 3, 4, and/or 5 and may be predicted using the systems of FIGS. 2 and/or 6. Recommended outfit combination 701 includes a dress, necklace, a purse, and heels. Recommended outfit combination 703 includes a blouse, pants, a necklace, and flats. Recommended outfit combination 705 includes a top, joggers, a vest, and sneakers. Recommended outfit combinations 701, 703, and 705 each include a combination of multiple items from different possible categories such as dresses, tops, bottoms, accessories, second layers, outer wear, and/or footwear, etc. In various embodiments, a recommended outfit combination includes one or more items from a selection of different outfit item categories such as tops, bottoms, footwear, accessories, outerwear, second layers, and/or inner layers, etc. In some embodiments, certain categories may be defined as requiring an item and other categories may allow for the selection of one or more optional items.

In various embodiments, recommendations 700 are recommended based on the preferences of the customer and are generated by using a machine learning model trained on the customer's preferences. In some embodiments, recommended outfit combinations 701, 703, and 705 are further based on the context for the recommendation (e.g., date-night outfit, work outfit, beach vacation outfit, weather, calendar entries, mood, etc.). In some embodiments, recommendations 700 may be further modified and/or filtered by a stylist (or customer). For example, a stylist may add one or more accessories to an outfit combination, swap out one item for another from an outfit combination, swap out one or more recommended outfit combinations for different recommended outfit combinations, etc. In some embodiments, the items of recommendations 700 are based on the items available to the customer. For example, some (or all) items of recommended outfit combinations 701, 703, and 705 are owned by the customer. In some embodiments, the majority of the items of recommendations 700 are available to the customer and one or more of the remaining items of recommended outfit combinations 701, 703, and/or 705 are available for trial or purchase. Recommendations 700 are provided to the customer as examples of how to integrate potential new items into the customer's existing wardrobe.

In some embodiments, feedback on recommendations 700 may be gathered to train the recommendation prediction process. For example, users may provide subjective and/or objective feedback including feedback on whether each style matches the customer's style preferences and/or whether the items fit well. Users may also provide feedback on the context a recommended outfit combination is appropriate for. For example, a customer may provide feedback that a recommended outfit combination is ideal for a date night, work event, speaking event, formal event, casual event, workout class, running, mood, etc. In some scenarios, recommendations 700 are provided based on one or more context parameters and a user provides feedback on whether the recommendation matches the context parameters. For example, an outfit combination is recommended for a date night and the customer provides feedback on whether the recommendation matches the customer's style for a date night outfit.

Figure 8:
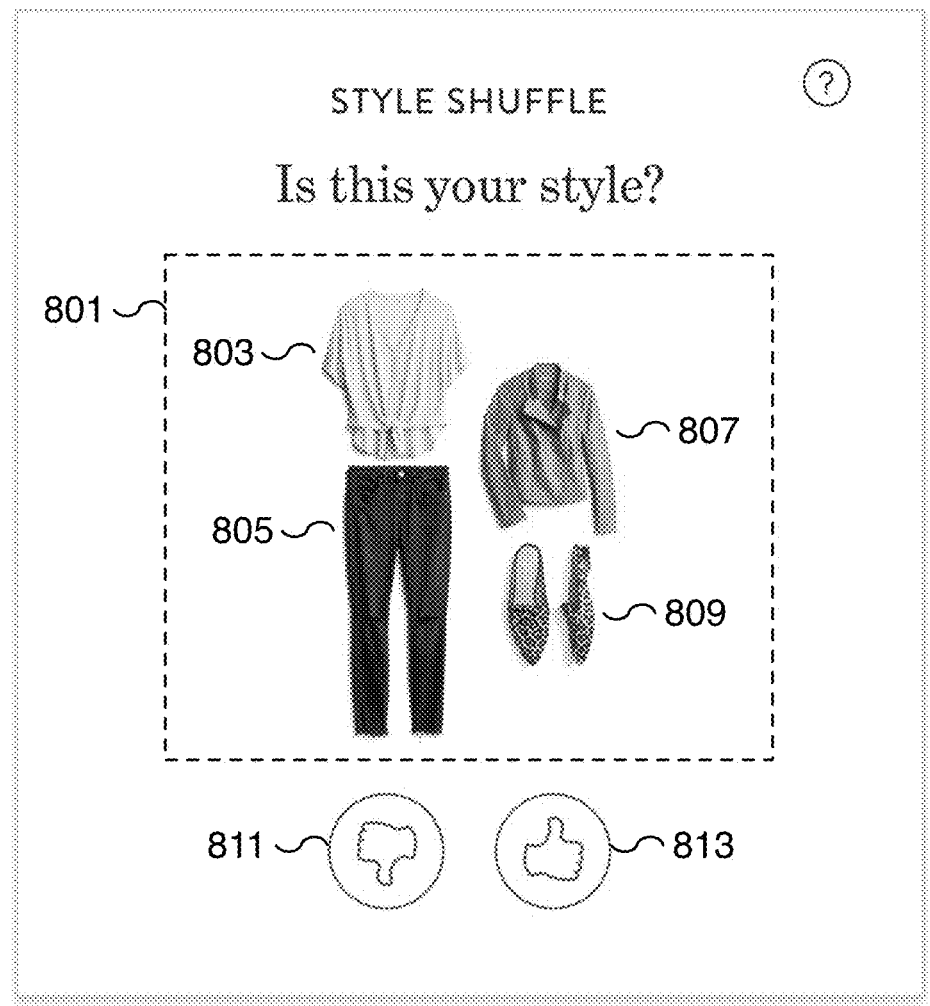
FIG. 8 is a diagram illustrating an embodiment of a user interface for outfit combination recommendation and feedback.

FIG. 8 is a diagram illustrating an embodiment of a user interface for outfit combination recommendation and feedback. In the example shown, outfit combination 801 (outlined by the dotted rectangle) includes top 803, bottom 805, jacket 807, and shoes 809. In various embodiments, outfit combination 801 is generated using the processes of FIGS. 1, 3, 4, and/or 5 and may be predicted using the systems of FIGS. 2 and/or 6. In some embodiments, outfit combination 801 is generated by a human stylist and is used to assess the style preferences of a customer. The user interface of FIG. 8 includes user interface components 811 and 813 depicting thumbs down and thumbs up icons, respectively. In various embodiments, user interface components 811 and 813 are used by a customer to provide feedback on outfit combination 801. Both negative feedback, corresponding to selecting user interface component 811, and positive feedback, corresponding to selecting user interface component 813, are used to train a machine learning model for predicting the style preferences of a customer. In some embodiments, text input, a scaled rating, different user interface feedback such as swipe left and swipe right, or other input methods are used to provide feedback on presented outfit combination 801.

In some embodiments, users provide context feedback on outfit combinations such as outfit combination 801. For example, a user responds to questions regarding the different contexts outfit combination 801 is suited for. A user may provide feedback on whether the user would wear outfit combination 801 for a date night, for a work event, for travelling, etc. Context-based feedback provided by the user can be used to improve the accuracy of a recommendation prediction model. In various embodiments, the feedback is objective and/or subjective. For example, different customers can provide different subjective feedback. One customer may find an outfit combination appropriate for work while another may find the same outfit combination too casual and prefer more formal work outfit combinations. In some embodiments, the user provides one or more context-based feedback responses by tagging an outfit combination with one or more tags or context descriptions. For example, feedback on an outfit combination can include "date night," "feeling lazy," "meeting in-law," "rainy day," "spin class," etc. In various embodiments, the feedback may be gathered using the user interface of FIG. 8 or another appropriate tool such as design tool 209 of FIG. 2. In some embodiments, the user interface allows the user to modify the outfit combination and adjust the context feedback accordingly. In various embodiments, a set of potential tags or context descriptions can be automatically suggested based on an analysis of the outfit combination.

Figure 9A:
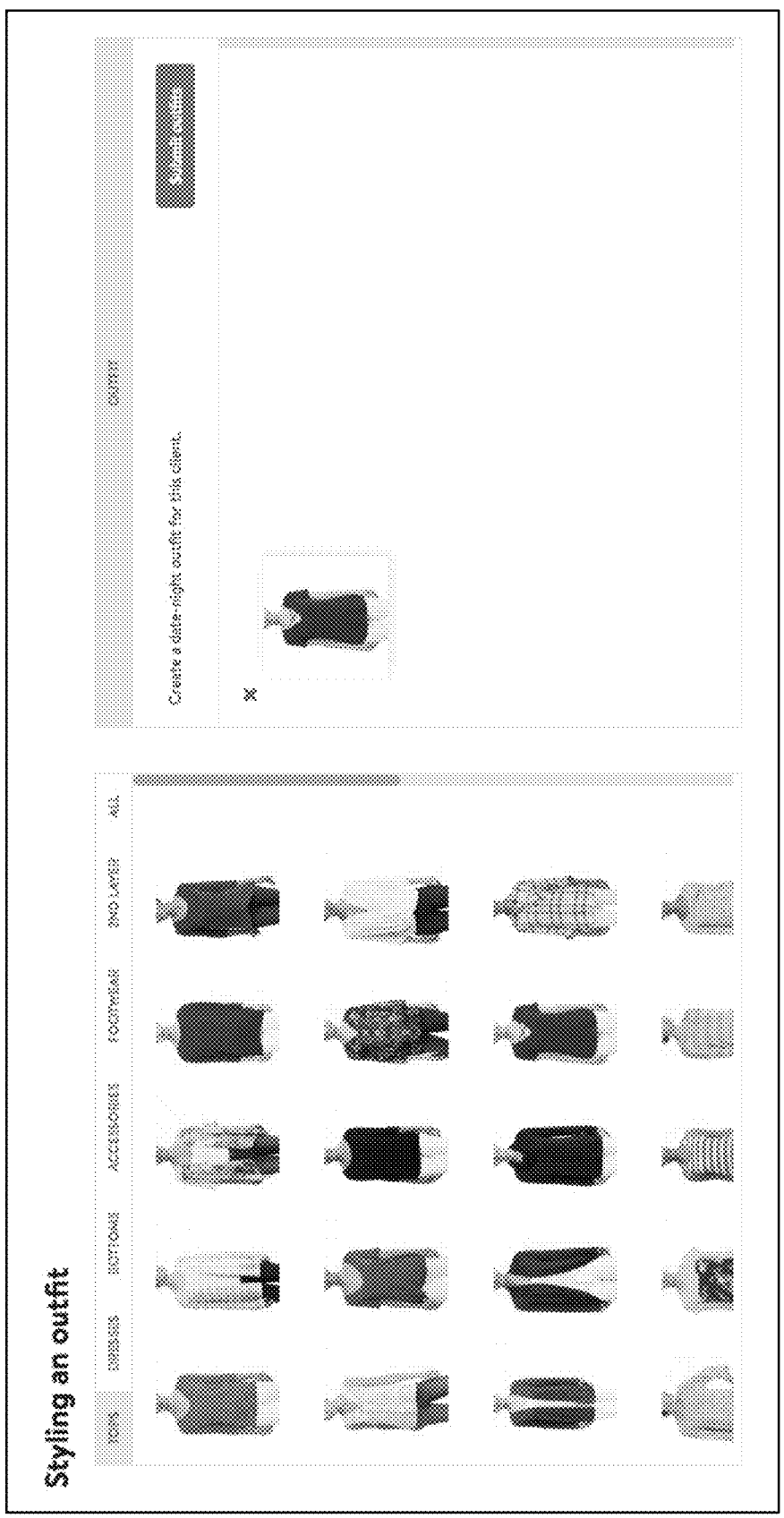
FIG. 9A is a diagram illustrating a user interface for creating an outfit combination for training a prediction model.

FIG. 9A is a diagram illustrating a user interface for creating an outfit combination for training a prediction model. In the example shown, the user interface of FIG. 9A is used to select a top from available tops for creating an outfit combination. In some embodiments, outfit combinations are created for particular contexts. In the example shown, the outfit combination is a date-night outfit for a particular client. The outfit created using the user interface of FIGS. 9A, 9B, and 9C may be used to train a machine learning model for predicting outfit combinations, for example, based on style and context. A customer and/or stylist may generate the sample outfit combination according to the customer's desired style preference. The generated outfit combination is then incorporated into the training data set for training a machine learning model to recommend outfits for the customer. Once a top is selected, the user interface is used to select another item of the outfit combination as shown in FIG. 9B.

Figure 9B:
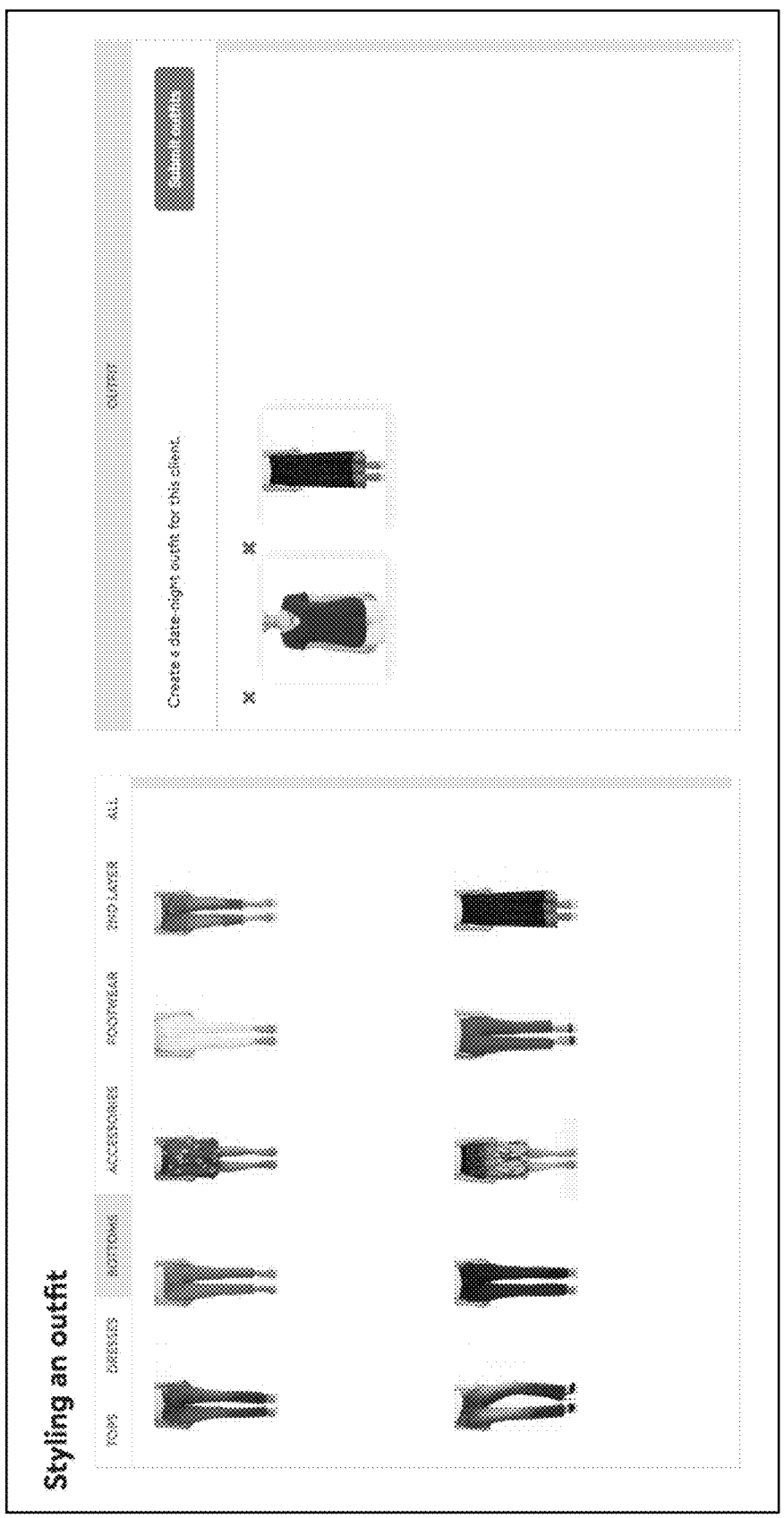
FIG. 9B is a diagram illustrating a user interface for creating an outfit combination for training a prediction model.

FIG. 9B is a diagram illustrating a user interface for creating an outfit combination for training a prediction model. In the example shown, the user interface of FIG. 9B is used to select a bottom from available bottoms. The selected bottom is matched with the selected top from FIG. 9A. Once the bottom item is selected, the user interface is used to select another item as shown in FIG. 9C.

Figure 9C:
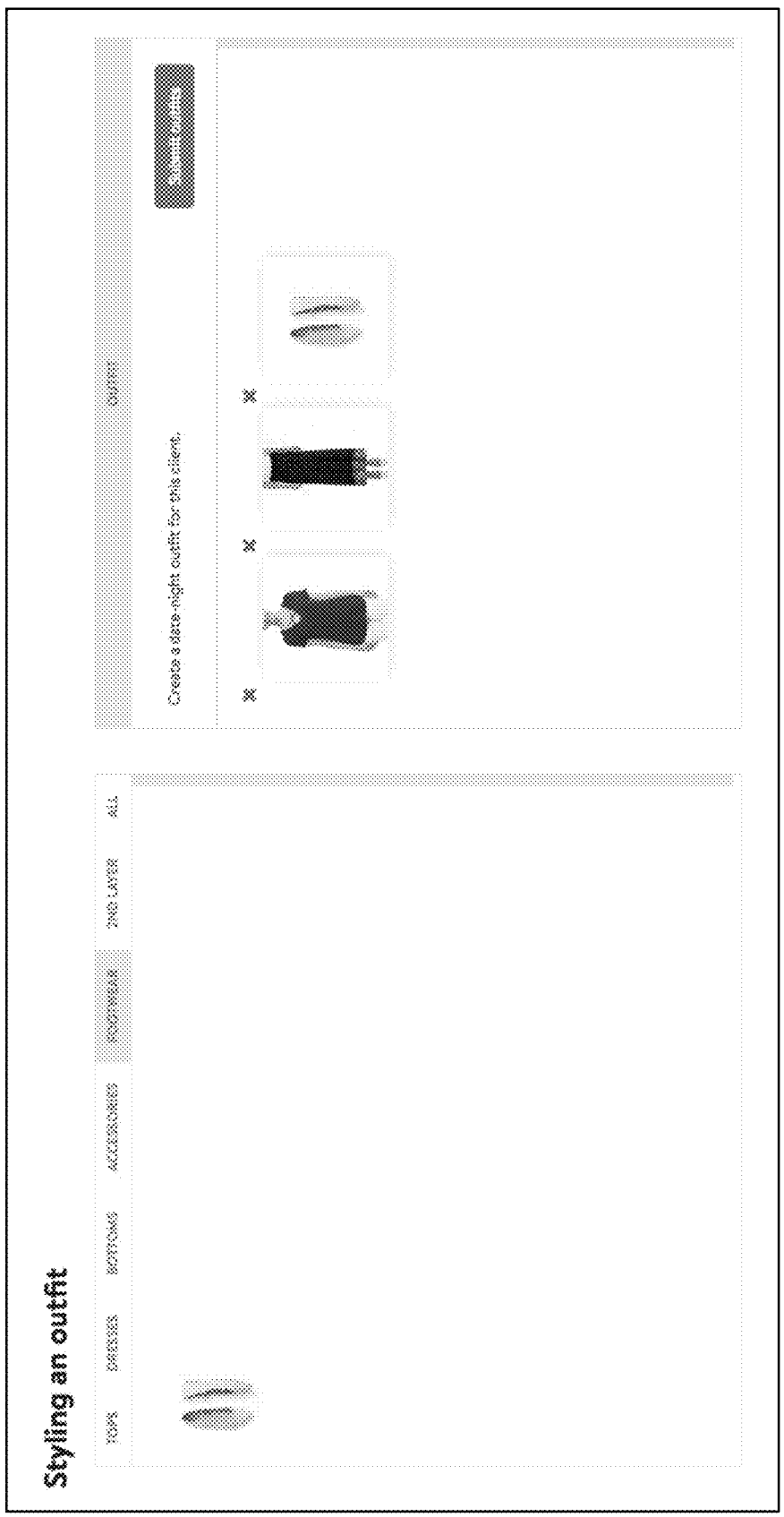
FIG. 9C is a diagram illustrating a user interface for creating an outfit combination for training a prediction model.

FIG. 9C is a diagram illustrating a user interface for creating an outfit combination for training a prediction model. In the example shown, the user interface of FIG. 9C is used to select a pair of shoes from available footwear. In some embodiments, the combination of three items, a top, a bottom, and footwear, is an example of a stylist created outfit that can be used for training style preferences. Additional items may be added to the outfit. For example, items may be selected from additional categories such as accessories and second layer. Once an outfit combination is complete, the finished outfit combination is submitted using the "Submit outfits" button. In some embodiments, outfit combinations are stored in a feedback profile data store such as feedback profile data store 201 of FIG. 2. The submitted outfit combinations can be utilized as training data to train a machine learning model. In some embodiments, the process of training the model uses the process of FIG. 4.

In various embodiments, the example user interfaces of FIGS. 9A, 9B, and 9C present different available items by categories, including the categories tops, dresses, bottoms, accessories, footwear, second layer, and all. Alternative or additional categories may be used as appropriate. In some embodiments, the selection can be filtered, for example, by size, material, fit, trends, color, or other filter parameters. In some embodiments, the user interfaces of FIGS. 9A, 9B, and 9C are part of design tool 209 of FIG. 2 for generating outfit combinations. In some embodiments, the outfit combinations generated as demonstrated by FIGS. 9A, 9B, and 9C are used to generate preference and/or training data for the processes of FIGS. 1, 3, 4, and/or 5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    accessing, by a processor, a catalog of physical items associated with a target user, wherein at least a portion of the catalog is at least in part automatically generated based on a retention of one or more of the physical items provided to the target user;
    training, by the processor, a machine learning model using a training set of data associated with a segmented target category, wherein a plurality of users are included in the segmented target category based on a plurality of user attributes, wherein training the machine learning model includes adding or modifying one or more user attributes to the plurality of user attributes until a threshold amount of training data is included in the training set of data associated with the segmented target category, wherein the training set of data associated with the segmented target category includes using outfit combination information gathered from other users;
    using, by the processor, the trained machine learning model trained to automatically determine for the target user, at least a portion of one or more recommended outfit combinations of a plurality of physical items among the physical items within the catalog; and
    providing, by the processor, to the target user an indication of a selected one of the one or more recommended outfit combinations, wherein the indication of the selected one of the one or more recommended outfit combinations includes a rendering of the selected recommended outfit combination on a three-dimensional model associated with the target user.

2. The method of claim 1, wherein the machine learning model is trained using retention data associated with at least a portion of the other users.

3. The method of claim 1, wherein the outfit combination information gathered from the other users is a selected subset among a larger set of available outfit combination information for a group of users that includes at least the other users.

4. The method of claim 1, wherein the outfit combination information gathered from the other users is selected for use in training the machine learning model including by identifying one or more defining features of the target user and determining the other users that share the one or more defining features.

5. The method of claim 1, wherein the machine learning model is one of a plurality of available machine learning models and the machine learning model is selected for use based on a user segment corresponding to the target user.

6. The method of claim 5, wherein each of the plurality of available machine learning models corresponds to different user segments.

7. The method of claim 1, further comprising receiving a feedback of the selected one of the one or more recommended outfit combinations from the target user.

8. The method of claim 7, wherein the feedback includes an outfit combination style preference of the target user.

9. The method of claim 7, wherein the feedback includes a description of a modified outfit combination based on the selected one of the one or more recommended outfit combinations.

10. The method of claim 1, further comprising:
receiving from the target user a submission describing one or more additional physical items; and
updating the catalog of physical items associated with the target user to include the one or more additional physical items.

11. The method of claim 1, further comprising:
receiving a command to manipulate the three-dimensional model of the target user;
modifying the three-dimensional model of the target user based on the received command; and
rendering a new image of the selected recommended outfit combination on the modified three-dimensional model corresponding to a new perspective of the modified three-dimensional model.

12. The method of claim 1, further comprising:
receiving a weather context for the target user, wherein the recommended outfit combinations are automatically determined based at least in part on the received weather context.

13. The method of claim 1, further comprising:
receiving one or more shared calendar events of the target user, wherein the recommended outfit combinations are automatically determined based at least in part on the received one or more shared calendar events.

14. The method of claim 13, wherein the one or more shared calendar events include a wedding, a business meeting, a vacation, or an exercise class.

15. The method of claim 1, further comprising:
receiving a specification of a recently worn item by the target user, wherein the one or more recommended outfit combinations are automatically determined based at least in part on excluding the recently worn item from the catalog of physical items associated with the target user until a time threshold has elapsed.

16. The method of claim 1, wherein a delivery time of the indication of the selected one of the one or more recommended outfit combinations is configured by the target user.

17. The method of claim 1, further comprising generating a packing list of physical items corresponding to the selected one of the one or more recommended outfit combinations.

18. A method, comprising:
selecting, by a processor, a product item from an inventory based on a prediction score for a target user;
accessing, by a processor, a catalog of physical items associated with the target user, wherein at least a portion of the catalog is at least in part automatically generated based on a retention of one or more of the physical items provided to the target user;
training, by the processor, a machine learning model using a training set of data associated with a segmented target category, wherein a plurality of users are included in the segmented target category based on a plurality of user attributes, wherein training the machine learning model includes adding or modifying one or more user attributes to the plurality of user attributes until a threshold amount of training data is included in the training set of data associated with the segmented target category, wherein the training set of data associated with the segmented target category includes using outfit combination information gathered from other users;
using, by the processor, the trained machine learning model to automatically determine for the target user, at least a portion of one or more recommended outfit combinations of a plurality of physical items among the physical items within the catalog, wherein the one or more recommended outfit combinations each include the selected product item; and
providing, by the processor, to the target user the product item and an indication of a selected one of the one or more recommended outfit combinations, wherein the indication of the selected one of the one or more recommended outfit combinations includes a rendering of the selected recommended outfit combination on a three-dimensional model associated with the target user.

19. A system, comprising:
a processor configured to:
access a catalog of physical items associated with a target user, wherein at least a portion of the catalog is at least in part automatically generated based on a retention of one or more of the physical items provided to the target user;
train a machine learning model using a training set of data associated with a segmented target category, wherein a plurality of users are included in the segmented target category based on a plurality of user attributes, wherein training the machine learning model includes adding or modifying one or more user attributes to the plurality of user attributes until a threshold amount of training data is included in the training set of data associated with the segmented target category, wherein the training set of data associated with the segmented target category includes using outfit combination information gathered from other users;
use the trained machine learning model trained to automatically determine for the target user, at least a portion of one or more recommended outfit combinations of a plurality of physical items among the physical items within the catalog; and
provide to the target user an indication of a selected one of the one or more recommended outfit combinations, wherein the indication of the selected one of the one or more recommended outfit combinations includes a rendering of the selected recommended outfit combination on a three-dimensional model associated with the target user; and
a memory coupled to the processor and configured to provide the processor with instructions.

* * * * *